United States Patent [19]
Ishii et al.

[11] Patent Number: 5,877,886
[45] Date of Patent: Mar. 2, 1999

[54] OPTICAL BEAM SCANNING METHOD AND APPARATUS, AND IMAGE FORMING METHOD AND APPARATUS

[75] Inventors: Akira Ishii; Hideki Moriya; Kenji Ogi; Koichiro Shinohara; Masahiro Takamatsu, all of Nakai-machi, Japan

[73] Assignee: Fuji Xerox Co., Ltd., Tokyo, Japan

[21] Appl. No.: 736,514

[22] Filed: Oct. 24, 1996

[30] Foreign Application Priority Data

Dec. 20, 1995 [JP] Japan ................................ 7-332372

[51] Int. Cl.⁶ ................................................ G02B 26/08
[52] U.S. Cl. ........................................ 359/212; 359/216
[58] Field of Search ............................ 359/201, 202, 359/212–219, 315, 318, 196, 197; 347/256–261

[56] References Cited

U.S. PATENT DOCUMENTS 5,608,563  3/1997  Matsumura et al. .................... 359/202

FOREIGN PATENT DOCUMENTS

A-64-32691  2/1989  Japan .
A-3-131818  6/1991  Japan .

*Primary Examiner*—James Phan
*Attorney, Agent, or Firm*—Oliff & Berridge, PLC

[57] ABSTRACT

In view of realizing higher resolution in the sub-scanning direction and achieving high precision and high quality image formation without generating ununiform distribution of exposure, a scanning surface of a photosensitive material is scanned with an optical beam on sequential parallel linear scanning lines with a predetermined angle for the main scanning direction to form an exposed image thereon.

3 Claims, 19 Drawing Sheets

DISTRIBUTION IN AMOUNT OF
EXPOSURE OF CROSS SECTION 8-8'

DISTRIBUTION IN AMOUNT OF EXPOSURE OF CROSS SECTION 11-11'

SCHEMATIC DIAGRAM OF EXPOSED IMAGE

DISTRIBUTION IN AMOUNT OF EXPOSURE OF CROSS SECTION 15-15'

| | | | | |
|---|---|---|---|---|
| MSB | | | | LSB |
| 1 | | | | CONCENTRATION VALUE (GRAY SCALE) |
| FL3 | FL2 | FL1 | FL0 | |

| FL3 | FL2 | FL1 | FL0 | MEANING |
|---|---|---|---|---|
| 1 | 0 | 0 | 0 | RIGHT |
| 1 | 0 | 0 | 1 | LOWER |
| 1 | 0 | 1 | 0 | LEFT |
| 1 | 0 | 1 | 1 | UPPER |
| 1 | 1 | 0 | 0 | VERTICLE CENTER |
| 1 | 1 | 0 | 1 | LATERAL CENTER |
| 1 | 1 | 1 | 0 | UNUSED |
| 1 | 1 | 1 | 1 | UNUSED |

FIG.22

OPTICAL BEAM SCANNING METHOD AND APPARATUS, AND IMAGE FORMING METHOD AND APPARATUS

BACKGROUND OF THE INVENTION

1. Field of the Invention

The present invention relates to an optical beam scanning method and apparatus for scanning the scanning surface with an optical beam and an image forming method and apparatus for forming images by exposing a photosensitive material with scanning with an optical beam, and particularly to an optical beam scanning method and apparatus which have enhanced resolution in the sub-scanning direction and an image forming method and apparatus for enhancing resolution in the sub-scanning direction without generation of ununiform distribution of exposure to realize high precision and high quality image forming.

2. Description of the Related Art

As an image forming apparatus which forms images using an optical beam such as a digital copying machine and laser printer, apparatuses are known in which an optical beam modulated in accordance with image information is reflected for deflection by an optical deflector, for example, a polygon mirror and the scanning surface such as a photosensitive material surface is scanned with such an optical beam to record image information.

However, since the optical beam scanning line on the scanning surface is discrete in the period of the main scanning in such an image forming apparatus, there rises problems such as lower drawing accuracy in the sub-scanning direction, for example, lower resolution in the sub-scanning direction, generation of jagged oblique lines (jaggy), lower reproducibility of fine lines. Therefore, it is difficult to provide high precision character and line images required in the field of the printing and desktop publishing.

Meanwhile, resolution in the sub-scanning direction can be improved through high speed main scanning by rotating a polygon mirror at a high speed, but it has been difficult to simultaneously realize high speed main scanning and high resolution because there is a limitation in mechanical drive to attain the high speed rotation of the polygon mirror.

Therefore, in view of overcoming such problems, the system for realizing zigzag scanning by an optical beam has been proposed, for example, in Japanese Unexamined Patent Publication Nos. Sho 64-32691 (1989) and Hei 3-131818 (1991).

In this optical beam scanning system, when the optical beam is used for scanning in the main scanning direction, the optical beam is repeatedly displaced only in a very short distance (for example, distance equal to the sub-scanning pitch or one-half of the distance) in the sub-scanning direction using an optical beam defection element such as a piezoelectric element and electro-optical element, the loci of the zigzag optical beam scannings are respectively formed on the main scanning lines (N, N+1, . . . ) on the scanning surface as shown in FIG. 26.

In this optical beam scanning system, when the optical beam is used for scanning in the sub-scanning direction, the regions between the adjacent main scanning lines can also be scanned and therefore resolution in the sub-scanning direction can be enhanced and the drawing accuracy, as a result, in the sub-scanning direction can be improved.

However, the optical beam scanning system of the related art has a problem that since a difference in the scanning rates at the internal and external sides of the optical beam is generated at each displacement point in the sub-scanning direction, namely at each bending part, ununiform distribution of exposure is generated at such displacement points. FIG. 27 shows an exposed image appearing when the optical beam is used for zigzag scanning in a pitch P/2 which is a one-half of the sub-scanning pitch P. In this figure, the amount of exposure increases at internal regions 32A of pixels 32 corresponding to the bending parts because the scanning rate is rather lower, while the amount of exposure reduces at external regions 32B because the scanning rate is rather fast. Thereby, ununiformity is generated in distribution of exposure and the areal modulation of exposed images faithful to concentration information and edge information of pixels is disabled, resulting in the disadvantage that high precision and high quality image forming is impossible. This disadvantage also occurs, for example, in an optical beam scanning apparatus for image reading.

SUMMARY OF THE INVENTION

It is therefore an object of the present invention to provide an optical beam scanning method and apparatus which realizes scanning with a high resolution in the sub-scanning direction.

It is another object of the present invention to provide an image forming method and apparatus which improves resolution in the sub-scanning direction to realize high precision and high quality image forming without generation of ununiformity in the exposure distribution.

In view of overcoming the problems explained above and in order to realize scanning with high resolution in the sub-scanning direction, the present invention provides an optical beam scanning method for emitting an optical beam modulated depending on image information and scanning a scanning surface having a predetermined size in the main scanning direction and sub-scanning direction with the optical beam by sequentially following parallel linear scanning lines with a predetermined angle for the main scanning direction.

In order to realize scanning with high resolution in the sub-scanning direction, the present invention also provides an optical beam scanning method for emitting an optical beam modulated depending on image information and scanning a scanning surface having a predetermined size in the main scanning direction and sub-scanning direction with the optical beam by sequentially following parallel linear scanning lines with a predetermined angle for the main scanning direction in such a length as shorter than the size in the main scanning direction.

The scanning by the optical beam explained above may also be executed by repeatedly following the linear scanning lines continuously in the sub-scanning direction on the scanning surface and moreover by repeatedly following the linear scanning lines discontinuously in the sub-scanning direction on the scanning surface.

In order to realize scanning with high resolution in the sub-scanning direction, the present invention also provides an optical beam scanning apparatus comprising: a light source for emitting an optical beam modulated depending on image information; and scanning means for scanning a scanning surface having a predetermined size in the main scanning direction and sub-scanning direction with the optical beam by sequentially following parallel linear scanning lines with a predetermined angle for the main scanning direction.

In order to realize scanning with high resolution in the sub-scanning direction, the present invention also provides an optical beam scanning apparatus comprising: a light source for emitting an optical beam modulated depending on image information; scanning means for scanning with the optical beam in the main scanning direction; deflecting means for deflecting the optical beam in the sub-scanning direction; and control means for scanning, by controlling the light source, scanning means and deflecting means, a scanning surface with the optical beam in the main scanning direction and scanning the scanning surface with the optical beam on a plurality of parallel linear scanning lines with a predetermined angle for the main scanning line and extending respectively from the optical beam scanned in the main scanning direction, in order to stop radiation of the optical beam or shorten the radiating time when the optical beam moves from one linear line to another linear line.

The control means preferably have a structure causing the scanning means to execute the scanning of the optical beam in the main scanning direction and causing the deflecting means to execute the deflection of the optical beam in the sub-scanning direction so that the scanning locus of the optical beam becomes a sawtooth shape. Moreover, the control means may have a structure causing the scanning means to execute the scanning of the optical beam in the main scanning direction and causing the deflecting means to execute the deflection of the optical beam in the sub-scanning direction so that the scanning locus of the optical beam becomes a triangular shape, and also causing the light source to emit the optical beam only in a half period of the deflection period of the defecting means.

In order to realize scanning with high resolution in the sub-scanning direction, the present invention also provides an optical beam scanning apparatus comprising: a light source for emitting an optical beam modulated depending on image information; scanning means for scanning with the optical beam in the main scanning direction; deflecting means for deflecting the optical beam in the sub-scanning direction; and control means for scanning, by controlling the light source, scanning means and deflecting means, a scanning surface with the optical beam in the main scanning direction and also scanning the scanning surface with the optical beam on a plurality of parallel linear scanning lines with a predetermined angle for the main scanning line and extending respectively from the optical beam scanned in the main scanning direction so that the plural parallel linear scanning lines become continuous for a plurality of main scanning lines on the scanning surface, in order to stop radiation of the optical beam or shorten the radiation time when the optical beam moves from one linear line to another linear line.

The control means explained above preferably has a structure to cause the scanning means to execute the scanning in the main scanning direction of the optical beam and cause the deflecting means to execute the deflection in the sub-scanning direction of the optical beam so that the scanning locus of the optical beam becomes a sawtooth shape. Moreover, it may have a structure to cause the scanning means to execute the scanning in the main scanning direction of the optical beam and cause the deflecting means to execute the deflection in the sub-scanning direction of the optical beam so that the scanning locus of the optical beam becomes a triangular shape, and also cause the light source to emit the optical beam only during a half period of the deflection period of the deflecting means.

In order to enhance resolution in the sub-scanning direction to form a high precision and high quality image without generation of ununiform distribution of exposure, the present invention also provides a image forming method comprising steps of: emitting an optical beam modulated depending on image information; moving a photosensitive material having a predetermined size in the main scanning direction at a predetermined speed in the sub-scanning direction; forming an electrostatic latent image on a scanning surface of the photosensitive material by scanning the scanning surface with the optical beam to sequentially follow parallel linear scanning lines with a predetermined angle for the main scanning direction; and executing image formation on a recording medium on the basis of the electrostatic latent image.

The scanning of the optical beam explained above may be executed by repeatedly following the linear scanning lines continuously in the sub-scanning direction on the scanning surface or by repeatedly following the linear scanning lines discontinuously in the sub-scanning direction on the scanning surface.

In order to enhance resolution in the sub-scanning direction to form a high precision and high quality image without generation of ununiform distribution of exposure, the present invention also provides an image forming apparatus comprising: a light source for emitting an optical beam modulated depending on image information; a photosensitive material having a predetermined size in the main scanning direction to be exposed by the optical beam to form an electrostatic latent image while moving at a predetermined speed in the sub-scanning direction; scanning means for scanning a scanning surface of the photosensitive material with the optical beam by sequentially following parallel linear scanning lines with a predetermined angle for the main scanning direction on the scanning surface of the photosensitive material; and image forming means for executing image formation on a recording medium on the basis of the electrostatic latent image on the photosensitive material.

In order to enhance resolution in the sub-scanning direction and form a high precision and high quality image without generation of ununiform distribution of exposure, the present invention also provides an image forming apparatus comprising: a light source for emitting an optical beam modulated depending on image information; scanning means for scanning with the optical beam in the main scanning direction; deflecting means for deflecting the optical beam in the sub-scanning direction; a photosensitive material exposed by the optical beam to form an electrostatic latent image while moving at a predetermined speed in the sub-scanning direction; control means for scanning, by controlling the light source, photosensitive material, scanning means and deflecting means, the photosensitive material with the optical beam in the main scanning direction and scanning the photosensitive material with the optical beam on a plurality of parallel linear lines with a predetermined angle for the main scanning line and respectively extending from the optical beam scanned in the main scanning direction, in order to stop radiation of the optical beam or shorten the radiation time; and image forming means for executing image formation on a recording medium on the basis of the electrostatic latent image on the photosensitive material.

The control means preferably has a structure to cause the scanning means to scan with the optical beam in the main scanning direction and the deflecting means to deflect the optical beam in the sub-scanning direction so that the scanning locus of the optical beam becomes a sawtooth shape. Moreover, the control means may have a structure to cause the scanning means to scan with the optical beam in the main scanning direction and the deflecting means to deflect the optical beam in the sub-scanning direction so that the scanning locus of the optical beam becomes a triangular shape, and also cause the light source to emit the optical beam only during a half period of the deflection period of the deflecting means.

The light source explained above preferably has a structure including one light emitting section to sequentially emit one optical beam to a plurality of radiation spots forming one pixel of the image information. Moreover, the light source may be of a multi-beam type which simultaneously emits a plurality of optical beams from a plurality of light emitting sections. In this case, it is possible that one optical beam is controlled by the control means explained above to execute zigzag scanning on a plurality of main scanning lines, while the other optical beams are controlled to execute the scanning on one main scanning line.

In order to enhance resolution in the sub-scanning direction without generation of ununiform distribution of exposure to form a high precision and high quality image, the present invention also provides an image forming apparatus comprising: image information converting means for receiving image information defining one pixel with a plurality of gradations to convert the image information into plural pieces of fine pixel information depending on the gradations; a light source for emitting an optical beam modulated depending on the plural pieces of fine pixel information; scanning means for scanning with the optical beam in the main scanning direction; deflecting means for deflecting the optical beam in the sub-scanning direction; a photosensitive material exposed by the optical beam to form an electrostatic latent image while moving at a predetermined speed in the sub-scanning direction; control means for scanning, by controlling the light source, photosensitive material, scanning means and deflecting means, the photosensitive material with the optical beam in the main scanning direction and scanning the photosensitive material with the optical beam on a plurality of parallel linear lines with a predetermined angle for the main scanning line and extending respectively from the optical beam scanned in the main scanning direction, in order to stop radiation of the optical beam or shorten the radiation time when the optical optical beam moves from one linear line to another linear line; and image forming means for executing image formation on a recording medium on the basis of the electrostatic latent image of the photosensitive material.

The control means explained above preferably has a structure to cause the scanning means to scan with the optical beam in the main scanning direction and to cause the deflecting means to deflect the optical beam in the sub-scanning direction so that the scanning locus of optical beam becomes a sawtooth shape. Moreover, the control means may have a structure to cause the scanning means to scan with the optical beam in the main scanning direction and to cause the deflecting means to deflect the optical beam in the sub-scanning direction so that the scanning locus of the optical beam becomes a triangular shape, and also cause the light source to emit the optical beam only during a half period of the deflection period of the deflecting means.

The image information converting means explained above is preferably structured comprising reference signal generating means for generating a plurality of reference signals of different periods obtained by multiplying the deflection period of the deflecting means by different magnifying powers, converting means for converting the image information into analog image information depending on the gradations, a plurality of comparing means for comparing the plurality of reference signals with the analog image information to output fine pixel information, and selecting means for selecting one comparing means from the plurality of comparing means. In this case, the selecting means explained above may also be structured to select one comparing means from the plurality of comparing means on the basis of the direction of an image informing position given to the image information.

In order to enhance resolution in the sub-scanning direction and form a high precision and high quality image without generation of ununiform distribution of exposure, the present invention also provides an image forming apparatus comprising: a light source for emitting an optical beam modulated depending on image information; scanning means for scanning with the optical beam in the main scanning direction; deflecting means for deflecting the optical beam in the sub-scanning direction; a photosensitive material exposed by the optical beam to form an electrostatic latent image while moving at a predetermined speed in the sub-scanning direction; control means for scanning, by controlling the light source, photosensitive material, scanning means and deflecting means, the photosensitive material with the optical beam in the main scanning direction and scanning the photosensitive material with the optical beam on a plurality of parallel linear lines with a predetermined angle for the main scanning line and extending respectively from the optical beam scanned in the main scanning direction so that the plural parallel linear lines become continuous for the plural main scanning lines, in order to stop radiation of the optical beam or shorten the radiation time when the optical beam moves from one linear line to another line; and image forming means for executing image formation on a recording medium on the basis of the electrostatic latent image on the photosensitive material.

The control means explained above is preferably structured to cause the scanning means to scan with the optical beam in the main scanning direction and cause the deflecting means to deflect the optical beam in the sub-scanning direction so that the scanning locus of the optical beam becomes a sawtooth shape. Moreover, the control means may also be structured to cause the scanning means to scan with the optical beam in the main scanning direction and cause the deflecting means to deflect the optical beam in the sub-scanning direction so that the scanning locus of the optical beam becomes a triangular shape, and simultaneously cause the light source to emit the optical beam only in a half period of the deflection period of the deflecting means.

Moreover, the light source explained above is preferably structured to include one light beam emitting section for sequentially emitting one optical beam to a plurality of radiation spots forming one pixel of the image information. Meanwhile, a multi-beam type for simultaneously emitting a plurality of optical beams from a plurality of light emitting sections may also be used. In this case, the control means explained above may control one optical beam to realize the zigzag scanning on a plurality of main scanning lines and the other optical beams to realize the scanning on one main scanning line.

In order to enhance resolution in the sub-scanning direction and form a high precision and high quality image without generation of ununiform distribution of exposure, the present invention also provides an image forming apparatus comprising: image information converting means for receiving image information defining one pixel with a plurality of gradations to convert the image information into plural pieces of fine pixel information depending on the gradations; a light source for emitting an optical beam modulated depending on the plural pieces of fine pixel information; scanning means for scanning with the optical beam in the main scanning direction; deflecting means for deflecting the optical beam in the sub-scanning direction; a photosensitive material exposed by the optical beam to form an electrostatic latent image while moving at a predetermined speed in the sub-scanning direction; control means for scanning, by controlling the light source, photosensitive material, scanning means and deflecting means, the photosensitive material with the optical beam in the main scanning direction and scanning the photosensitive material with the optical beam on a plurality of parallel linear lines with a predetermined angle for the main scanning line and extending respectively from the optical beam scanned in the main scanning direction so that the plural parallel linear lines become continuous for the plural main scanning lines, in order to stop radiation of the optical beam or shorten the radiation time when the optical beam moves from one linear line to another linear line; and image forming means for executing image formation on a recording medium on the basis of the electrostatic latent image on the photosensitive material.

The control means explained above is preferably structured to cause the scanning means to scan with the optical beam in the main scanning direction and the deflecting means to deflect the optical beam in the sub-scanning direction so that the scanning locus of the optical beam becomes a sawtooth shape. Moreover, the control means may also be structured to cause the scanning means to scan with the optical beam in the main scanning direction and the deflecting means to deflect the optical beam in the sub-scanning direction so that the scanning locus of the optical beam becomes a triangular shape, and also cause the light source to emit the optical beam only during a half period of the deflection period of the deflecting means.

The image information converting means explained above preferably comprises reference signal generating means for generating a plurality of reference signal of different periods obtained by multiplying the deflection period of the deflecting means by different magnifying powers, converting means for converting the image information into analog image information depending on the gradations, a plurality of comparing means for comparing the plurality of reference signals with the analog image information to output fine pixel information, and selecting means for selecting one comparing means from the plurality of comparing means. In this case, the selecting means explained above may be structured to select one comparing means from the plurality of comparing means on the basis of the direction of an image forming position given to the image information.

The present invention further provides an image forming apparatus for drawing image information on a photosensitive material moving in one direction by scanning the photosensitive material with an optical beam for each line in the other direction orthogonally crossing the one direction, comprising: an optical beam source; optical beam drive means for applying a beam modulation signal to the optical beam source in accordance with the image information; a rotating polygon mirror for scanning the photosensitive material in the other direction with an optical beam source from the optical beam source; an optical system for leading the optical beam source from the optical beam source to the photosensitive material through the rotating polygon mirror; an electro-optical element for periodically modulating the optical axis of the optical beam flux in a direction deflecting from the main axis of the optical system; and drive means for the electro-optical element for controlling the modulation degree and modulation period of the optical axis of the optical beam flux from the main axis of the optical system by the electro-optical element in synchronization with the beam modulation signal from the optical beam drive means, the drive means for the electro-optical element controlling the modulation degree and modulation period by the electro-optical element so that the optical beam source for scanning an N-th line on the photosensitive material in the other direction through the rotating polygon mirror becomes continuous with the optical beam source for scanning an (N+1)th line on the photosensitive material in the other direction through the rotating polygon mirror.

The present invention further provides an image forming apparatus for drawing image information on a photosensitive material moving in one direction by scanning the photosensitive material with an optical beam for each line in the other direction orthogonally crossing the one direction, comprising: an optical beam source; optical beam drive means for applying a beam modulation signal to the optical beam source in accordance with the image information; a rotating polygon mirror for scanning the photosensitive material in the other direction with an optical beam source from the optical beam source; an optical system for leading the optical beam source from the optical beam source to the photosensitive material through the rotating polygon mirror; an electro-optical element for periodically modulating the optical axis of the optical beam flux in a direction deflecting from the main axis of the optical system; and drive means for the electro-optical element for controlling the modulation degree and modulation period of the optical axis of the optical beam flux from the main axis of the optical system by the electro-optical element in synchronization with the beam modulation signal from the optical beam drive means and scanning in zigzag the photosensitive material in the other direction through the polygon mirror, the drive means for the electro-optical element controlling the modulation degree and modulation period by the electro-optical element so that: a pitch of the zigzag optical flux of the optical beam source for scanning an N-th line on the photosensitive material in the other direction through the rotating polygon mirror is equal to a pitch of the zigzag optical flux of the optical beam source for scanning an (N+1)th line on the photosensitive material in the other direction through the rotating polygon mirror; and a phase of the zigzag optical flux of the optical beam source for scanning the N-th line on the photosensitive material in the other direction through the rotating polygon mirror is synchronized with a phase of the zigzag optical flux of the optical beam source for scanning the (N+1)th line on the photosensitive material in the other direction through the rotating polygon mirror.

BRIEF DESCRIPTION OF THE DRAWINGS

Other objects and advantages of the present invention will be apparent from the following detailed description of preferred embodiments thereof, which description should be considered in conjunction with the accompanying drawings in which:

FIG. 22 is an explanatory diagram showing direction flags in relation to the fifth embodiment;

DESCRIPTION OF THE PREFERRED EMBODIMENTS

An optical beam scanning method and apparatus, and an image forming method and apparatus of the present invention will be explained in detail with reference to the accompanying drawings.

Figure 1:
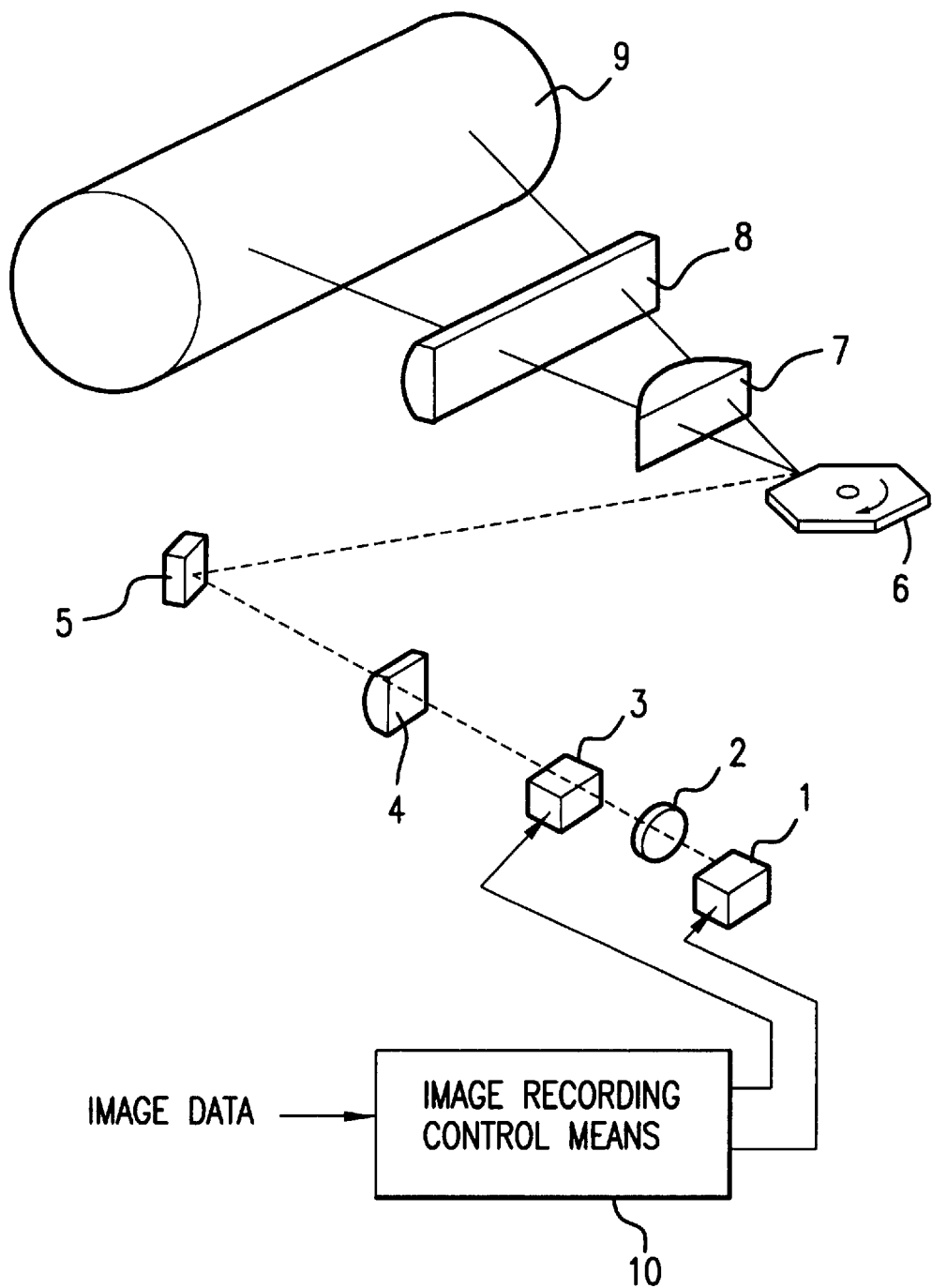
FIG. 1 is an explanatory diagram showing a first embodiment of the present invention.

FIG. 1 shows the structure of an image forming apparatus of a first embodiment of the present invention. This image forming apparatus comprises, as an optical beam scanning device, a semiconductor laser 1 for emitting an optical beam modulated depending on image data, a collimated lens 2 for converting the discrete optical beam emitted from the semiconductor laser 1 to a parallel optical beam, an electro-optical deflector 3 for displacing the parallel beam having passed the collimated lens 2 in the sub-scanning direction, a cylindrical lens 4 for focusing the parallel beam in the sub-scanning direction, a reflection mirror 5 for reflecting the optical beam having passed the cylindrical lens 4 in a predetermined direction, a polygon mirror 6 for reflecting for deflection the optical beam incoming from the reflection mirror 5, a fθ lens 7 for converging the deflection beam reflected for deflection by the polygon mirror 6 in the main scanning direction for scanning at a constant speed on a predetermined main scanning line, a cylindrical lens 8 for focusing the deflection beam from the polygon mirror 6 on the predetermined main scanning line by focusing the beam in the sub-scanning direction, a photosensitive drum 9 on which an electrostatic latent image is formed through optical beam scanning by arranging the exposure line in matching with the predetermined main scanning line, and image recording control means 10 for controlling the semiconductor laser 1 and electro-optical deflector 3 by receiving image data of 16 bits which is the bit map data of 96 DPM (Dot/mm) from an external host or the like. In addition to this structure, a developing unit for developing with toner the electrostatic latent image formed on the photosensitive drum 9, a transfer unit for transferring a toner image on the photosensitive drum 9 to a recording medium and a fuser for fixing the transferred image on the recording medium (not illustrated) are provided.

Figure 2:
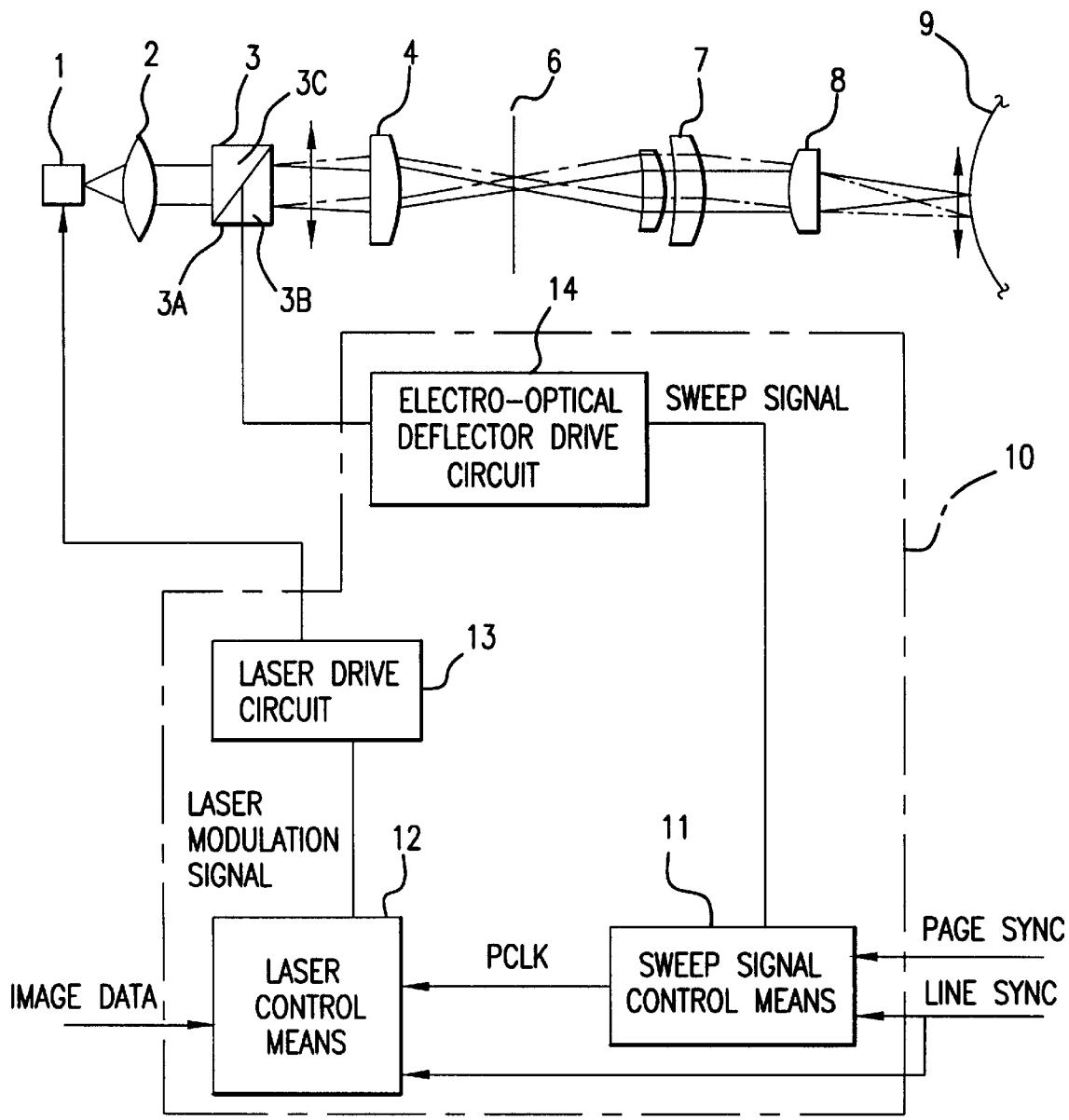
FIG. 2 is a block diagram showing image recording control means in relation to the first embodiment.

The image recording control means 10 comprises, as shown in FIG. 2, sweep signal control means 11 for receiving a page synchronous signal Page Sync and a synchronous signal Line Sync of main scanning outputted from a photodetector (not illustrated) for detecting the optical beam immediately before it is incident to the photosensitive drum 9 so as to output a pixel clock PCLK synchronized with the synchronous signal Line Sync of main scanning and a sawtooth sweep signal having the period four times longer than that of the pixel clock, laser control means 12 for receiving in parallel with the pixel clock PCLK image data of 16 bits corresponding to each pixel starting from the leading pixel of each line for each input of the synchronous signal Line Sync of main scanning so as to output, based on a dot clock DCLK of the frequency 16 times higher than that of the pixel clock PCLK, a laser modulation signal depending on the image pattern through the sequential parallel/serial conversion of the image data from the most significant bit, a laser drive circuit 13 for driving the semiconductor laser 1 based on the laser modulation signal, and an electro-optical deflector drive circuit 14 for driving the electro-optical deflector 3 based on the sweep signal.

Figure 3:
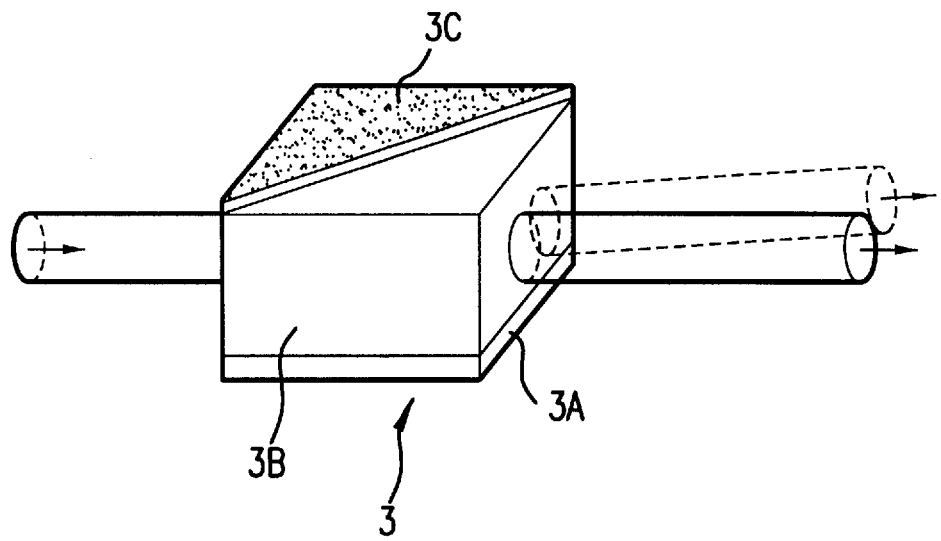
FIG. 3 is an explanatory diagram showing an electro-optical deflector in relation to the first embodiment.

FIG. 3 shows the structure of the electro-optical deflector 3. The electro-optical deflector 3 is structured by sticking a ground electrode 3A, an electro-optical element 3B composed of $LiNbO_3$ or PLZT and a prism electrode 3C. When a voltage based on a drive signal outputted from the electro-optical deflector drive circuit 14 is applied to the prism electrode 3C, an electric field is generated at the lower side thereof and a difference in refractive index is generated at the interface between the lower side and the region of the electro-optical element 3B not generating an electric field to change the angle of the emitted optical beam, that is, displace the optical beam in the sub-scanning direction.

Figure 4:
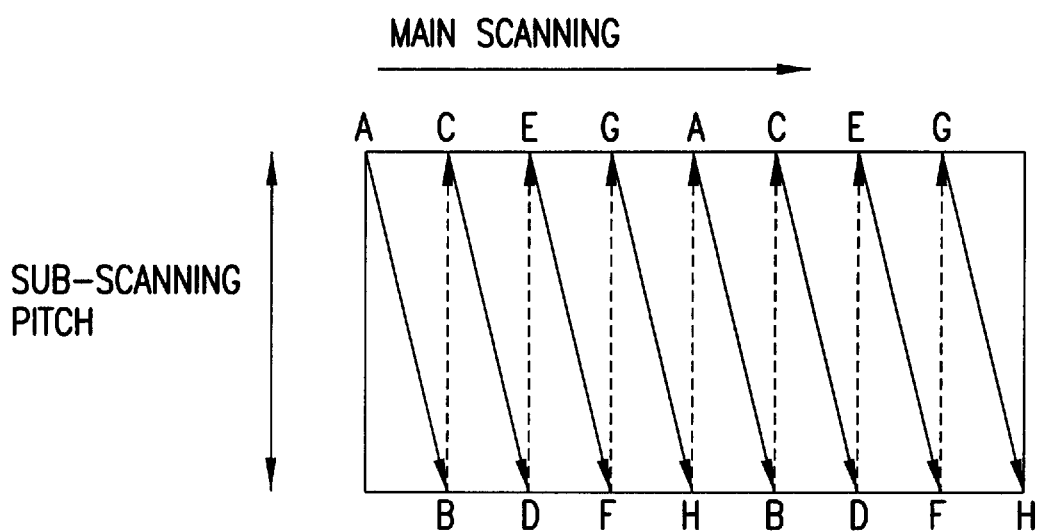
FIG. 4 is an explanatory diagram showing the scanning locus of the optical beam in relation to the first embodiment.

The sweep signal control means 11 is structured to displace the spot position of the optical beam in the sub-scanning direction by outputting the sawtooth sweep signal during the scanning of the optical beam in the main scanning direction to change the deflection amount of the optical beam of the electro-optical deflector 3 in the sub-scanning direction. Namely, as shown in FIG. 4, the optical beam spot position is displaced in the sub-scanning direction so that the sawtooth locus can be obtained when the optical beam scanning line on the photosensitive drum 9 in one pixel during the scanning of the optical beam in the main scanning direction alternately follows parallel oblique lines A–B, C–D, E–F and G–H having a predetermined angle for the main scanning direction and vertical lines B–C, D–E, F–G and H–A extending in the sub-scanning direction.

Figure 5:
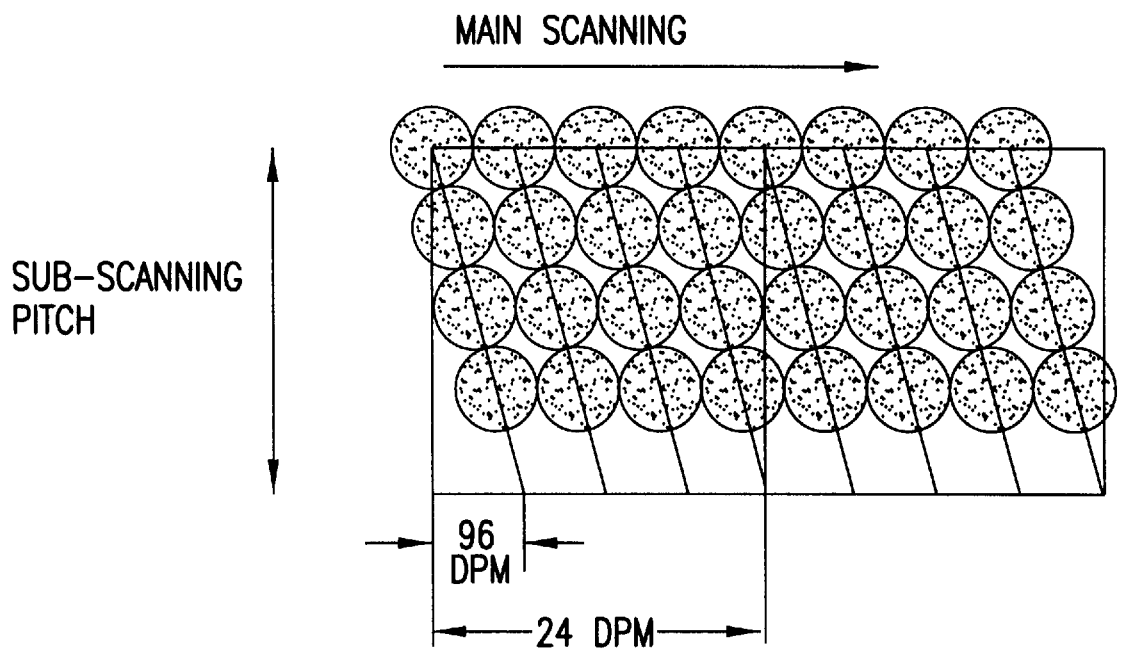
FIG. 5 is an explanatory diagram showing an exposed image based on the scanning locus of the optical beam in relation to the first embodiment.

FIG. 5 shows an exposed image on the photosensitive drum 9 when the optical beam is scanned in the sawtooth shape. When the optical beam is scanned in the sawtooth shape, each vertical line B–C, D–E, F–G and H–A of the scanning line is scanned momentarily. Therefore, the photosensitive drum 9 is not exposed and an exposed image of 4 dots corresponding to the gradation of 4 bits from the most significant bit of the image data of 16 bits are respectively formed on each oblique line A–B, C–D, E–F and G–H which is scanned during a predetermined time. In this embodiment, since one pixel is designed with 24 DPM, the preset oblique lines A–B, C–D, E–F and G–H are scanned in the period four times the 24 DPM and moreover an exposed image of one dot is formed in the ¼ period, the exposed image corresponds to the bit map data of 96 DPM.

Figure 6:
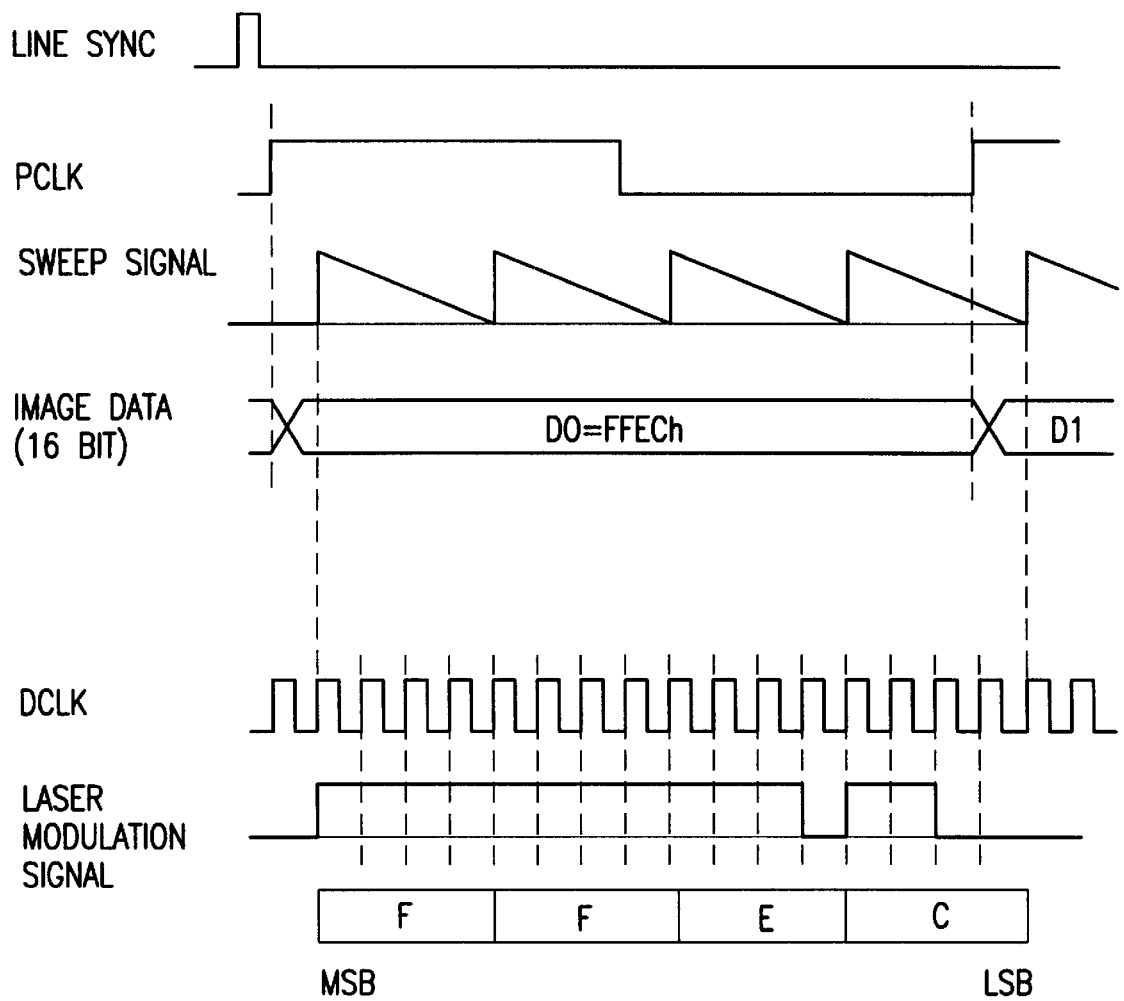
FIG. 6 is a timing chart showing the operation of the first embodiment.

An optical beam scanning method and image forming method of the present invention will be explained with reference to the timing chart of FIG. 6. Here, an example of image data where gradations of four bits from the most significant bit (MSB) to the least significant bit (LSB) are given as $F_h$, $F_h$, $E_h$ and $C_h$ will be explained. Of course, the gradations $F_h$, $F_h$, $E_h$ and $C_h$ will be interpreted, by the binary numbers, to "1111," "1111," "1110," "1100" and "1" means laser beam on, while "0" means laser beam off.

Upon input of the page synchronous signal Page Sync and the synchronous signal Line Sync of main scanning outputted from the photodetector, the sweep signal control means 11 outputs the pixel clock PCLK synchronized with the synchronous signal Line Sync of main scanning to the laser control means 12, while the sawtooth sweep signal of the period four times longer than that of the pixel clock PCLK to the electro-optical deflector drive circuit 14.

Upon input of the synchronous signal Line Sync of main scanning, the laser control means 12 sequentially receives in parallel the image data D0=FFEC of 16 bits corresponding to each pixel starting from the leading pixel of each line for each input in synchronization with the pixel clock PCLK. On the basis of the dot clock DCLK of the frequency 16 times higher than that of the pixel clock PCLK, the image data is converted sequentially from the most significant bit through parallel/serial conversion to generate the image patterns, that is, the laser modulation signals corresponding to the gradations of four bits $F_h$, $F_h$, $E_h$ and $C_h$. The laser control means 12 outputs these laser modulation signals to the laser modulation circuit 13.

The laser modulation circuit 13 drives, based on the laser modulation signal, the semiconductor laser 1 with a drive current which provides a predetermined amount of light emission, causing it to emit the optical beam.

The optical beam emitted from the semiconductor laser 1 is reflected for deflection by the polygon mirror 6 through the collimated lens 2, electro-optical deflector 3, cylindrical lens 4 and reflection mirror 5 to scan the main scanning line on the photosensitive drum 9 through the fθ lens 7 and cylindrical leans 8.

Meanwhile, the electro-optical deflector drive circuit 14 applies a drive voltage depending on the sawtooth sweep signal to the prism electrode 3C of the electro-optical deflector 3 to displace the optical beam passing the electro-optical deflector 3 in the sub-scanning direction.

Figure 7:
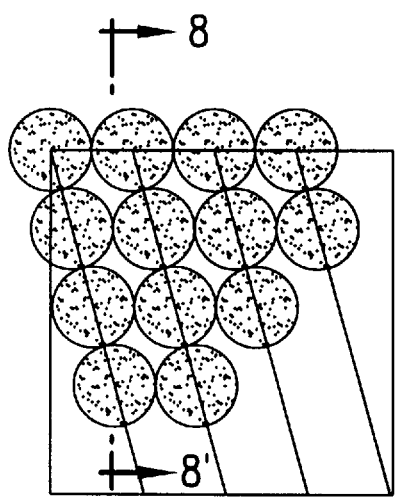
FIG. 7 is an explanatory diagram showing an exposed image formed on the basis of the timing chart of FIG. 6.
Figure 8:
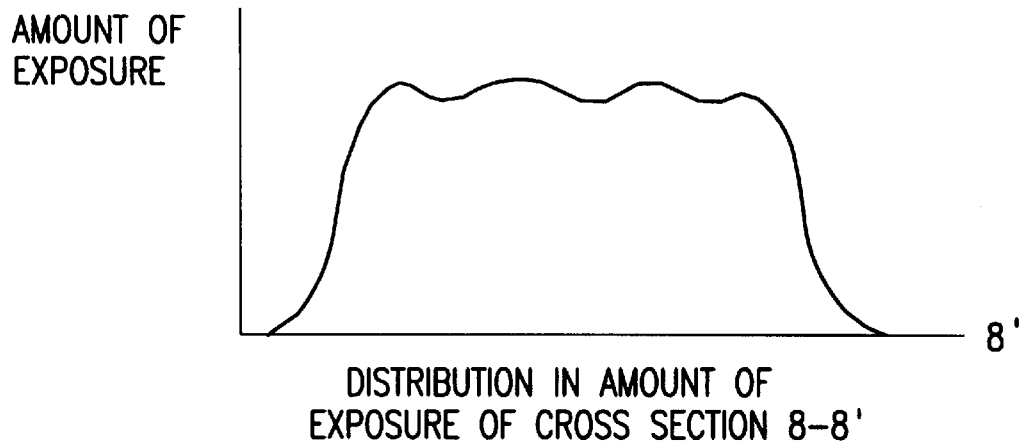
FIG. 8 is a graph showing distribution in the amount of exposure at the cross section of line 8–8' of the exposed image of FIG. 7.

When the optical beam is displaced in the sub-scanning direction depending on the sawtooth sweep signal during the scanning of the optical beam in the main scanning direction, the vertical lines of the scanning lines B–C, D–E, F–G and H–A are momentarily scanned. Therefore, the photosensitive drum 9 is not exposed, the exposed images of the dot patterns corresponding to the gradations of four bits from the most significant bit of the image data of 16 bits are respectively formed on the oblique lines A–B, C–D, E–F and G–H which are scanned in a predetermined time. Namely, as shown in FIG. 7, the exposed image based on the dot pattern corresponding to the image data D0=FFEC is expressed by aggregation of the oblique lines A–B, C–D, E–F and G–H which substantially become the scanning lines. This exposed image matches the binary data explained above and one pixel is formed of 4×4 dots. FIG. 8 shows distribution in the amount of exposure of the part 8–8' of the exposed image shown in FIG. 7. In this case, since the exposed image is formed by aggregation of the oblique lines A–B, C–D, E–F and G–H of the scanning line, distribution in the amount of exposure is almost uniform in the exposed image, even when the exposed image is depicted in resolution higher than that of the sub-scanning pitch.

When the exposed image is formed on the photosensitive drum 9, the image is developed with toner by the developing unit not illustrated, the toner image is transferred to a recording medium and the transferred image on the recording medium is fixed by the fuser not illustrated to complete the image formation. In this case, as explained above, since the exposed image may be depicted in resolution higher than that of the sub-scanning pitch which is determined by the rotating speed of the polygon mirror 6 and the rotating speed of the photosensitive drum 9 and moreover distribution in the amount of exposure is uniform, a high precision and high quality image can be reproduced on the recording medium.

Figure 9:
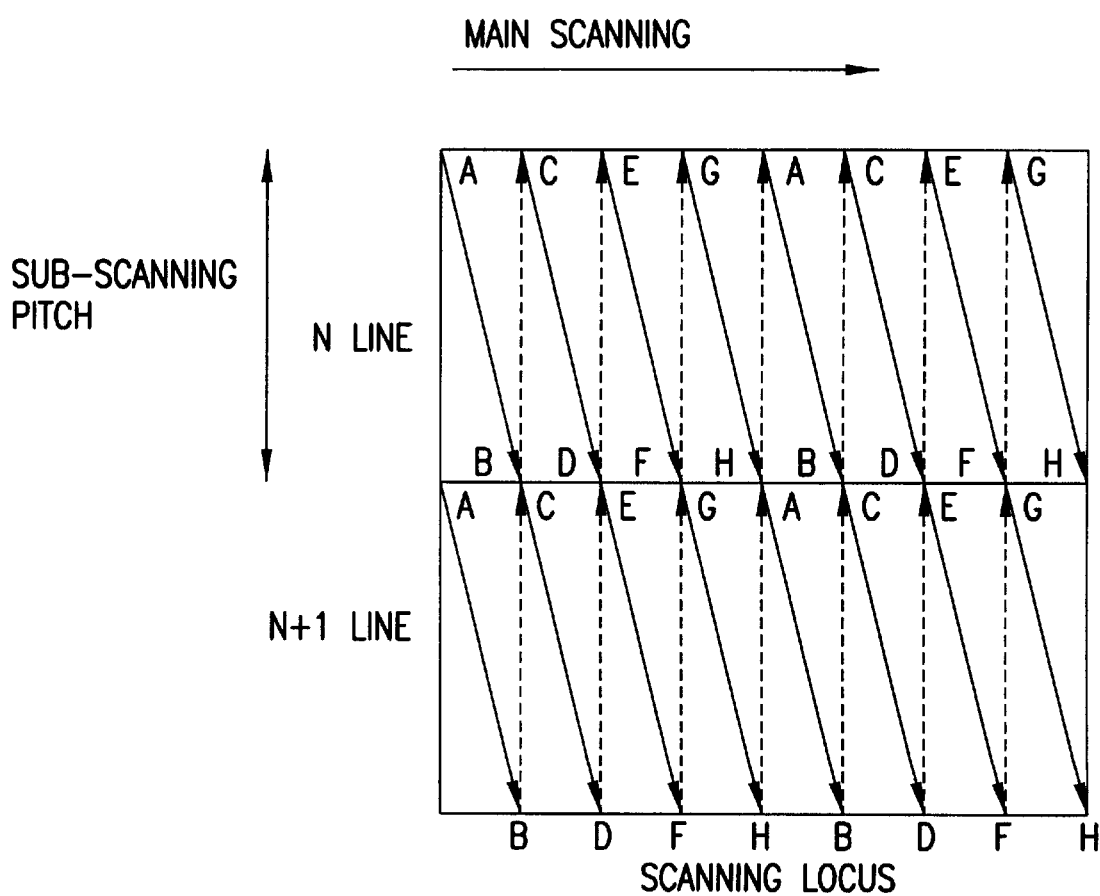
FIG. 9 is an explanatory diagram showing the scanning locus of the optical beam in relation to a second embodiment of the present invention.

FIG. 9 shows the scanning locus of the optical beam by an optical beam scanning apparatus and image forming apparatus as a second embodiment of the present invention. This embodiment is structured in such a manner that the sweep signal control means 11 in the first embodiment displaces the spot position of the optical beam in the sub-scanning direction so that oblique lines A–B, C–D, E–F and G–H of each pixel of the sawtooth scanning line of each main scanning line become continuous for a plurality of main scanning lines (in the N line and N+1 line in the figure).

Figure 10:
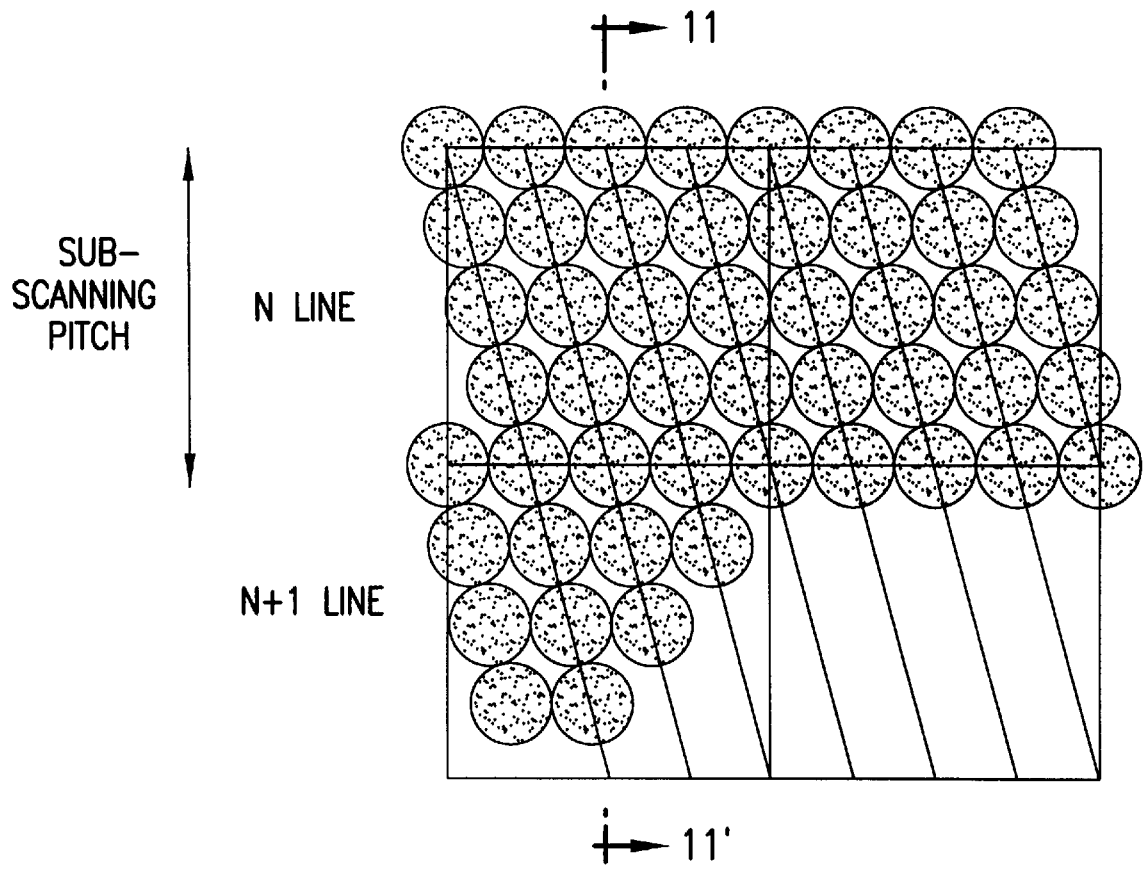
FIG. 10 is an explanatory diagram showing an exposed image on the basis of the scanning locus of the optical beam in relation to the second embodiment.

FIG. 10 shows an exposed image on the photosensitive drum 9 when the optical beam is scanned as shown in FIG. 9. An exposed image of dot patterns corresponding to the gradations of four bits from the most significant bit of image data of 16 bits corresponding to each pixel is respectively formed on the oblique lines A–B, C–D, E–F and G–H continuous for a plurality of main scanning lines (N line, N+1 line).

Figure 11:
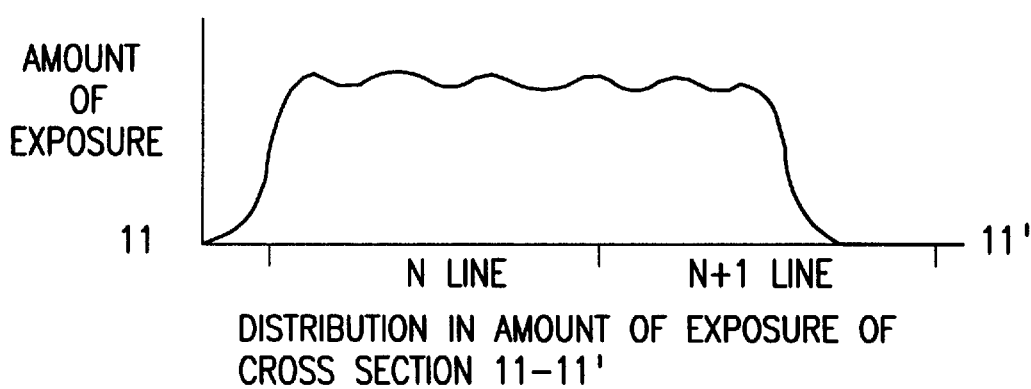
FIG. 11 is a graph showing distribution in the amount of exposure at the cross section of line 11–11' of the exposed image of FIG. 10.

FIG. 11 shows distribution in the amount of exposure at the part 11–11' of the exposed image. Since the exposed image of each main scanning line is formed by aggregation of the oblique lines A–B, C–D, E–F and G–H of the scanning line, distribution in the amount of exposure is almost uniform within the exposed image of each main scanning line even when the exposed image is depicted in resolution higher than that of the sub-scanning pitch. Moreover, since the oblique lines A–B, C–D, E–F and G–H of each pixel of the scanning line are continuous for a plurality of main scanning lines, ununiform distribution in the amount of exposure between the main scanning lines can be prevented.

Figure 12:
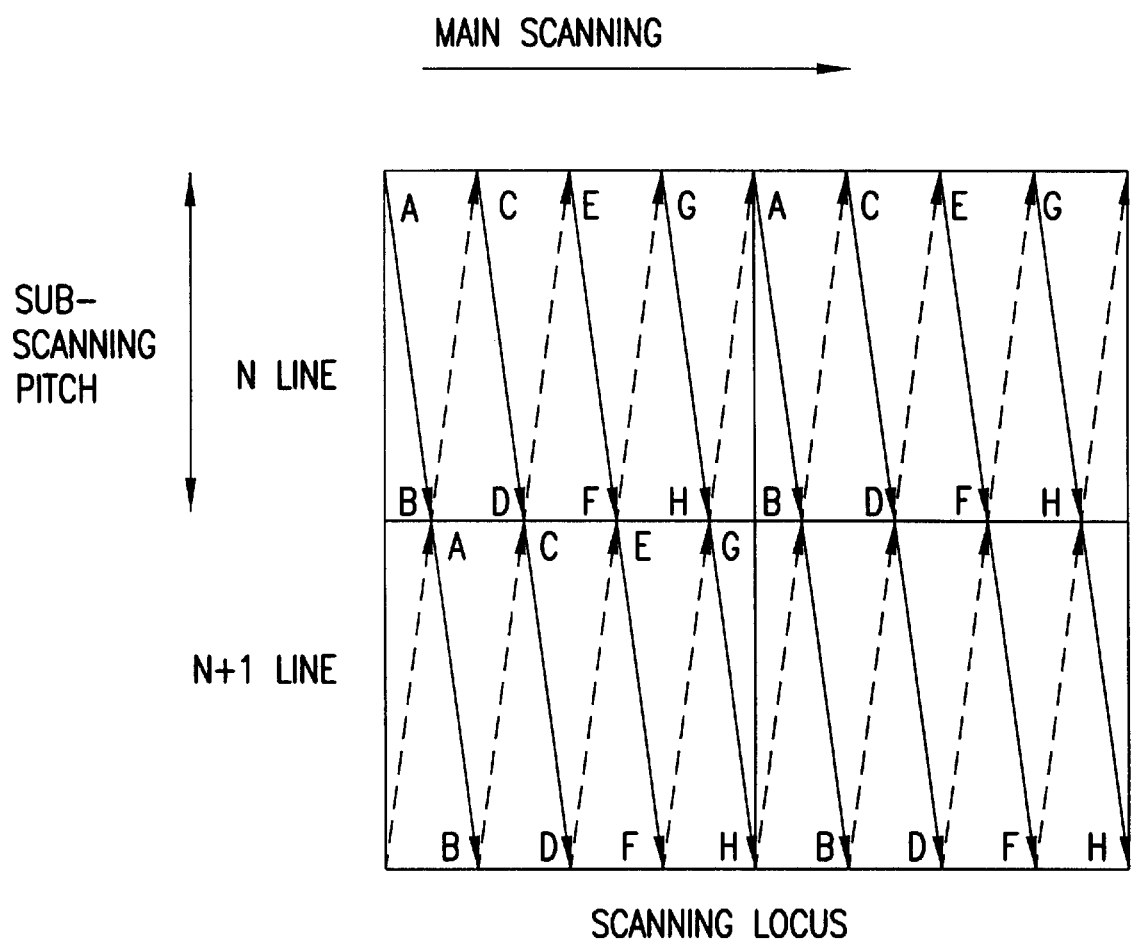
FIG. 12 is an explanatory diagram showing the scanning locus of the optical beam in relation to a third embodiment of the present invention.

FIG. 12 shows the scanning locus of the optical beam in an optical beam scanning apparatus and image forming apparatus as a third embodiment of the present invention. This embodiment is structured in such a manner that the sweep signal control means 11 outputs, in the first embodiment, a triangular sweep signal where the phase is inverted in every main scanning line (N line, N+1 line in the figure), in order to displace the spot position of the optical beam in the sub-scanning line so that the triangular locus can be obtained when the scanning line of the optical beam on the photosensitive drum 9 of one pixel in each main scanning line during scanning of the optical beam in the main scanning direction alternatively follows parallel oblique lines A–B, C–D, E–F and G–H having a predetermined angle for the main scanning direction and parallel oblique lines B–C, D–E, F–G and H–A having a predetermined angle for the main scanning direction in the inverse inclination to the oblique lines A–B, C–D, E–F and G–H, and moreover the laser control means 12 causes the semiconductor laser 1 to emit the optical beam only during the scanning of the oblique lines A–B, C–D, E–F and G–H.

Figure 13:
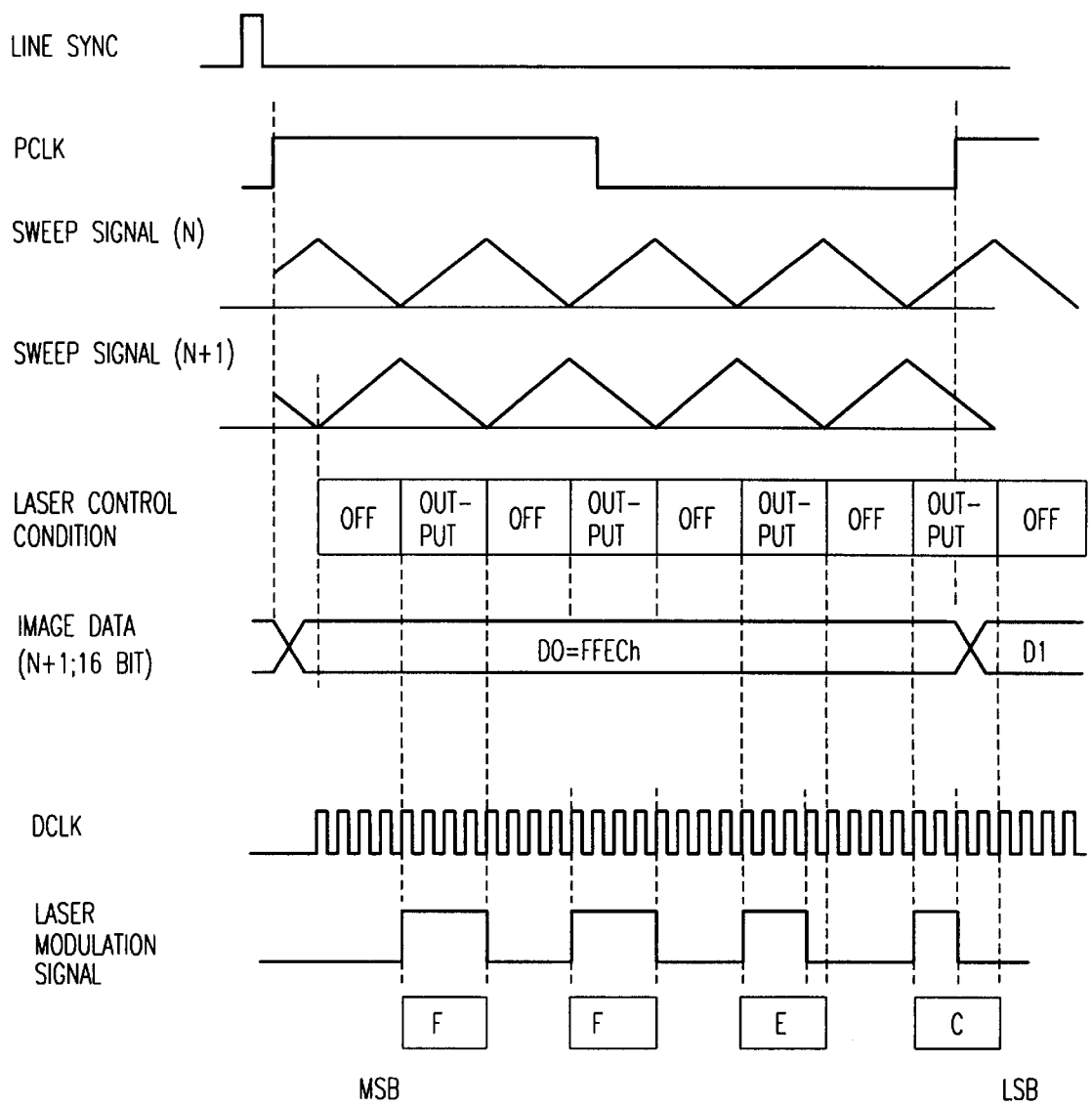
FIG. 13 is a timing chart showing the operation of the third embodiment.

FIG. 13 shows a timing chart when image data D0 where the gradations of four bits of each line given by FFEC is inputted to the leading pixel of the N+1 line. In this case, the sweep signal control means 11 outputs the triangular sweep signal of which phase is inverted from the phase in the scanning of the N line and the semiconductor laser 1 outputs the optical beam depending on the laser modulation signal only during the falling half period as the latter half period of the sweep signal.

Figure 14:
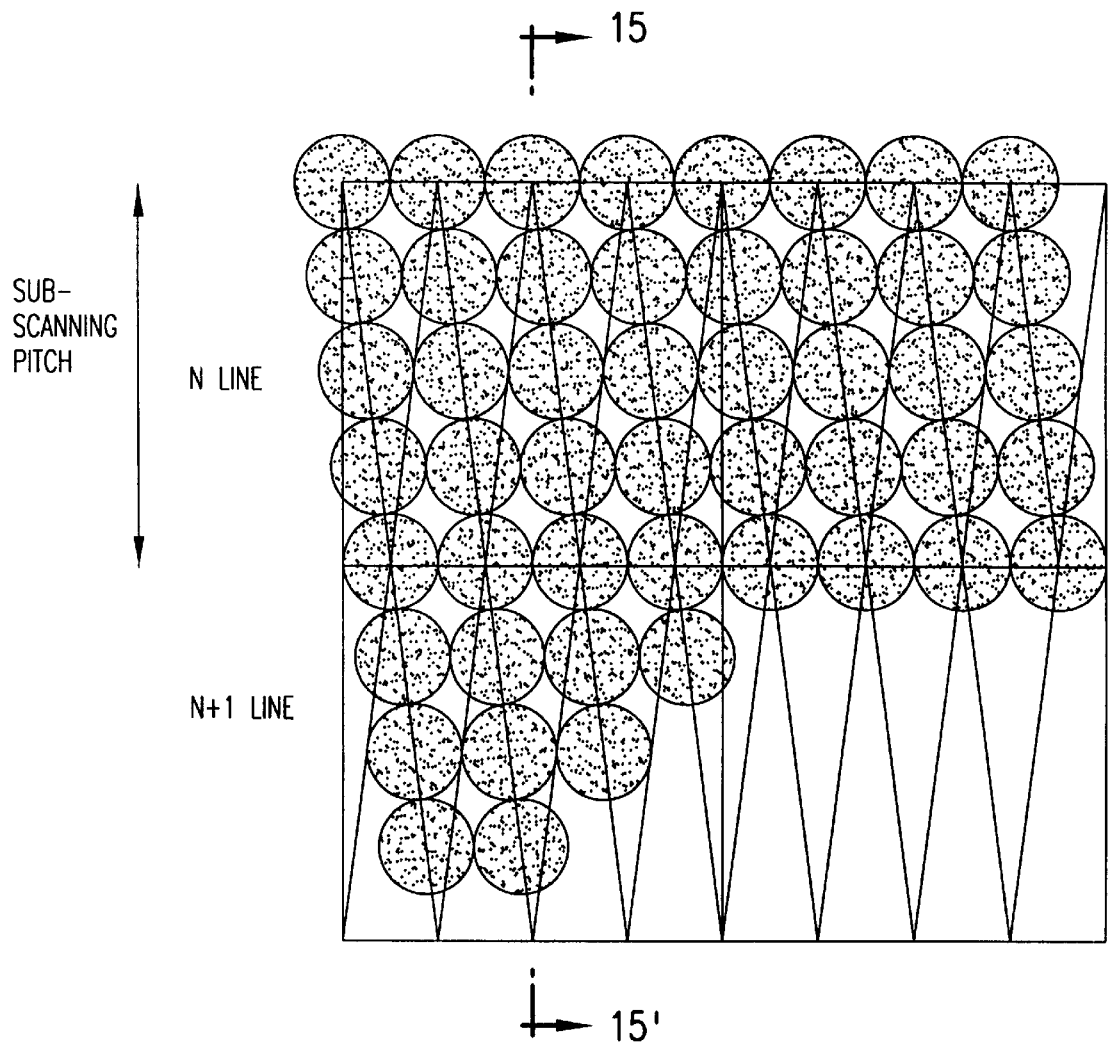
FIG. 14 is an explanatory diagram showing an exposed image formed on the basis of the timing chart of FIG. 13.
Figure 15:
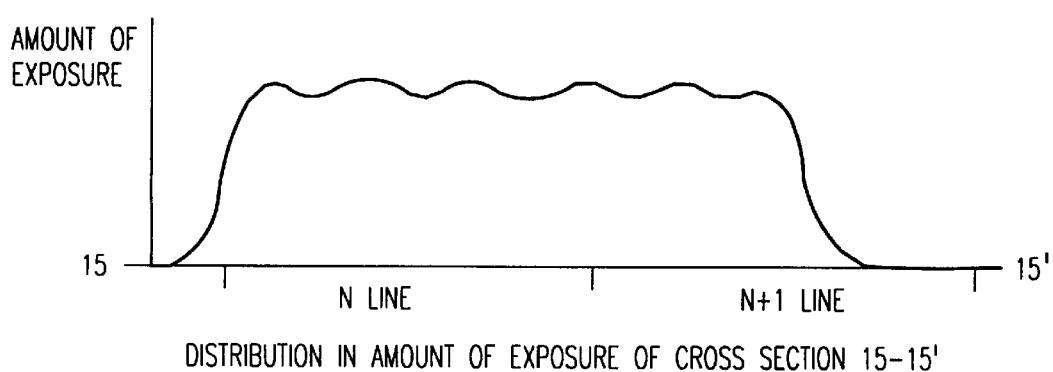
FIG. 15 is a graph showing distribution in the amount of exposure at the cross section of lien 15–15' of the exposed image of FIG. 13.

FIG. 14 shows an exposed image on the photosensitive drum 9 when the optical beam is scanned on the basis of the timing chart of FIG. 13. Since the phase of the scanning line of the triangular optical beam is inverted between the N line and the N+1 line, the oblique lines A–B, C–D, E–F and G–H of the N line and the oblique lines A–B, C–D, E–F and G–H of the N+1 line become the continuous scanning line. Therefore, an exposed image of dot patterns corresponding to the image data D0=FFEC is formed on the oblique lines A–B, C–D, E–F and G–H of the N+1 line at the leading pixel continuous from the oblique lines A–B, C–D, E–F and G–H of the leading pixel of the N line. FIG. 15 shows distribution in the amount of exposure at the part 15–15' of the exposed image of FIG. 14. Since the exposed image is formed by aggregation of the oblique lines A–B, C–D, E–F and G–H of the scanning line, almost uniform distribution in the amount of exposure can also be obtained in this embodiment.

Figure 16:
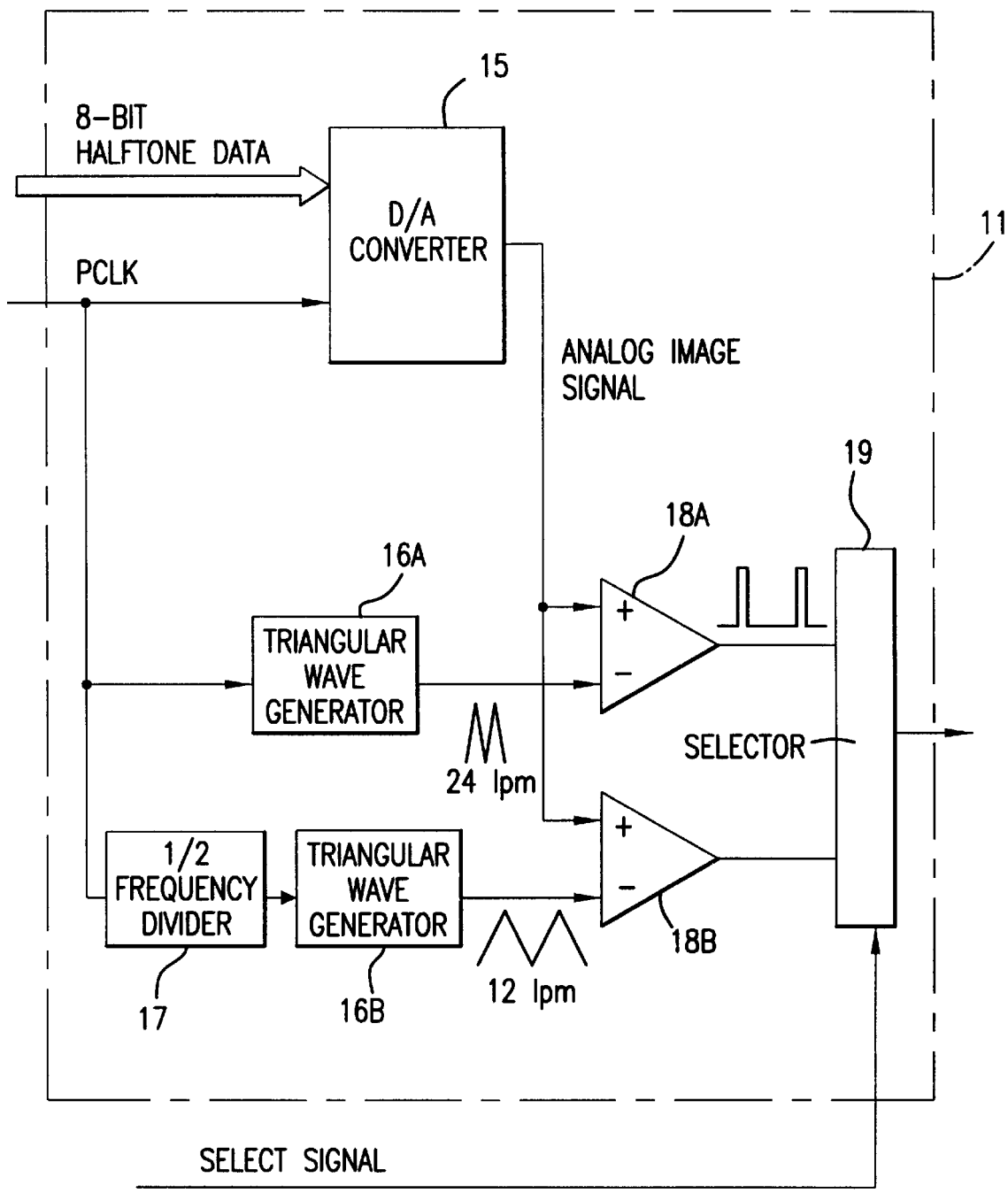
FIG. 16 is an explanatory diagram showing the structure of laser control means in relation to a fourth embodiment of the present invention.

FIG. 16 shows the structure of the laser control means 11 of an optical beam scanning apparatus and image forming apparatus as a fourth embodiment of the present invention. This embodiment shows an example for recording an intermediate gradation image data having multilevel data for each pixel and the halftone data is set by eight bits. The halftone data is converted to an analog signal by a D/A converter 15 for converting digital data to an analog signal and is then inputted to the positive inputs of voltage comparators 18A and 18B. Meanwhile, a triangular wave generator 16A generates a triangular wave signal of the same frequency as the pixel clock PCLK to give this signal as a comparison signal to the negative input of the voltage comparator 18A. A triangular wave generator 16B generates a triangular wave signal from the signal of the frequency divided to a half by a ½ frequency divider 17 from the pixel clock PCLK to give this signal as a comparison signal to the negative input of the voltage comparator 18B. The voltage comparators 18A and 18B compare the triangular wave signals from the triangular wave generators 16A and 16B with the analog signal from the D/A converter 15 to output a pulse signal depending on the value of the halftone data. A selector 19 selects any one output of the voltage comparators 18A and 18B depending on a select signal from an image quality control unit not illustrated to output the signal as a laser modulation signal to the laser drive circuit 13.

Figure 17:
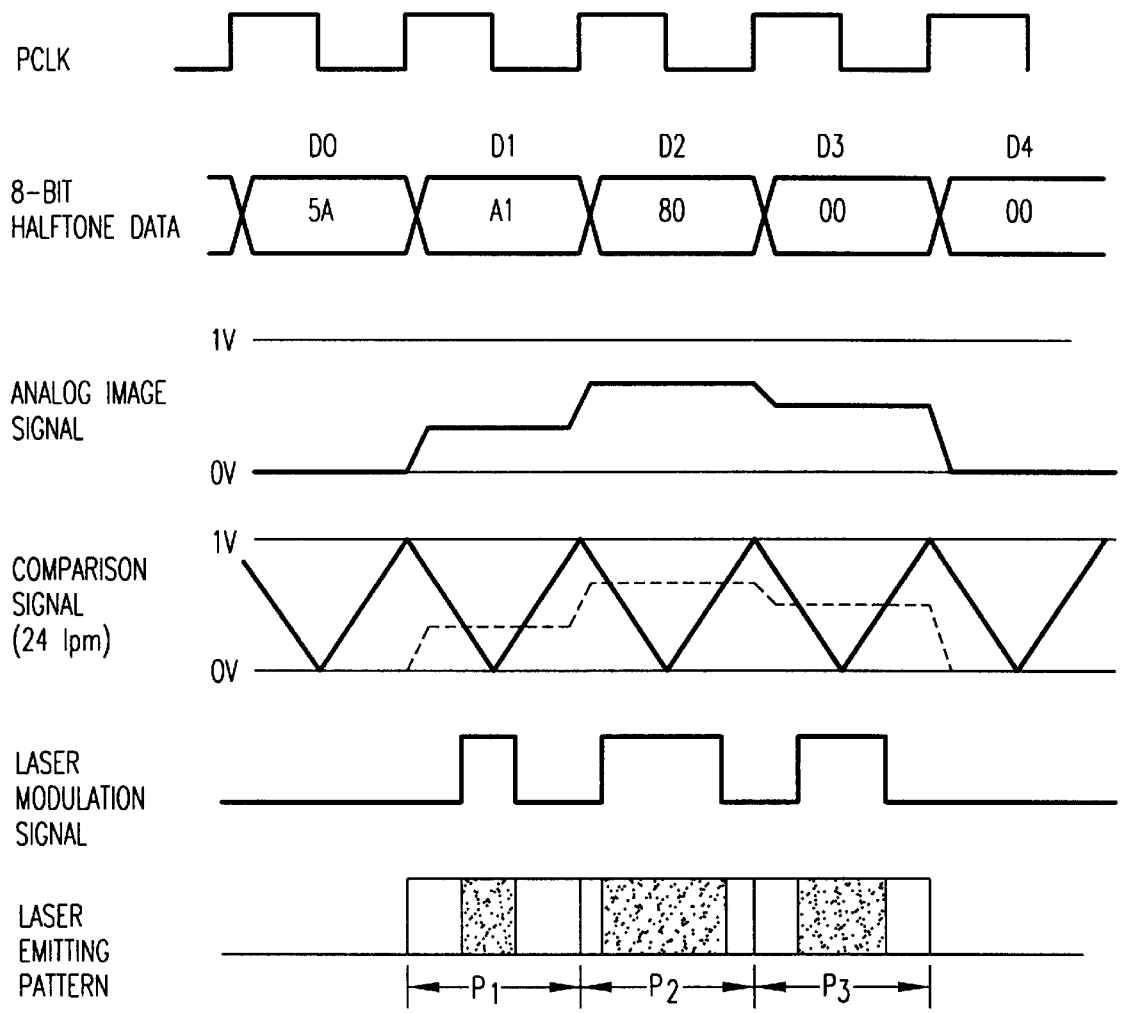
FIG. 17 is a timing chart showing the operation of the fourth embodiment.
Figure 19:
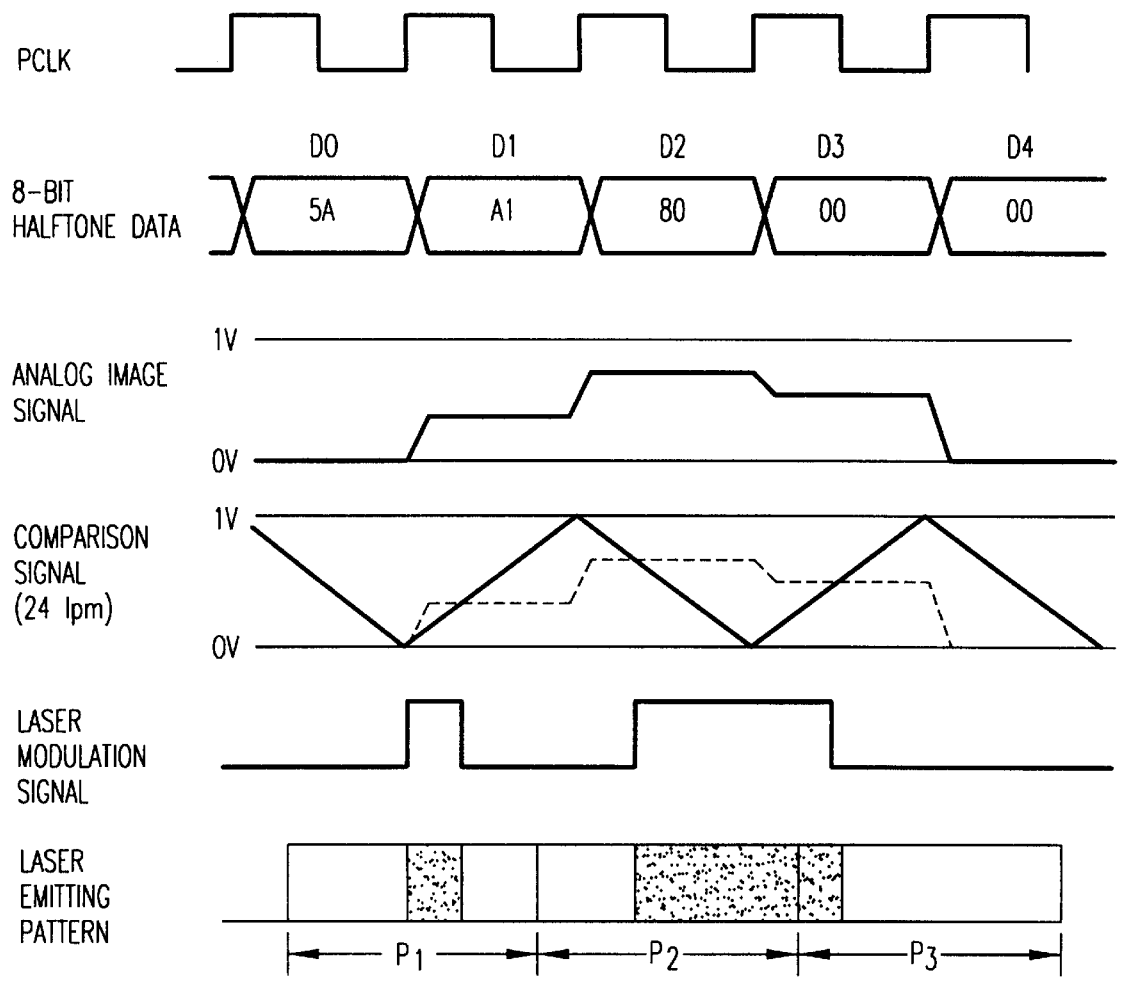
FIG. 19 is a timing chart showing another operation of the fourth embodiment.

The signals in the fourth embodiment are shown in FIG. 17 and FIG. 19. FIG. 17 shows an example where the selector 19 has selected the output of the voltage comparator 18A with the select signal. As the halftone data D0 to D4, hexadecimal values 5A, A1, 80, 00 and 00 are sequentially inputted. The output of the D/A converter 15 is set to 0V by the digital data 00 or to 1V by the digital data FF. The triangular wave generator 16A outputs the triangular wave signal of the period equal to that of the pixel clock PCLK with the amplitude of 0V to 1V. Therefore, the laser modulation signal as shown in the figure is outputted from the voltage comparator 18A and pixel patterns $P_1$, $P_2$ and $P_3$ corresponding to each pixel data are formed with laser beam emitting patterns depending on the laser modulation signal.

Figure 18:
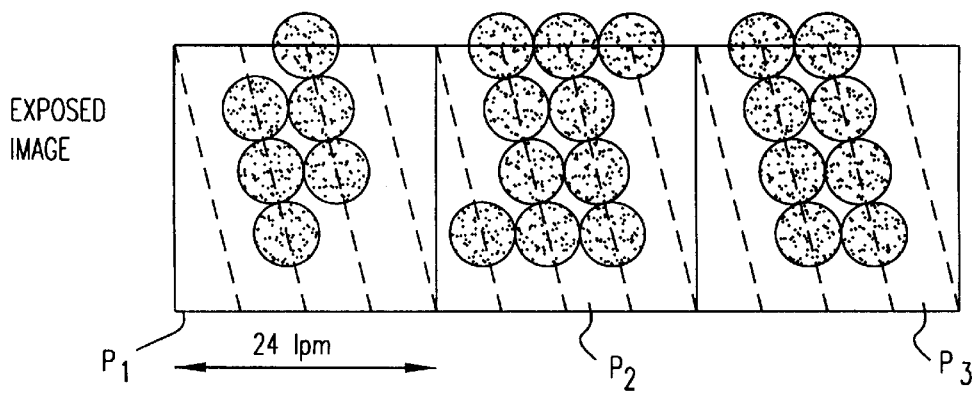
FIG. 18 is an explanatory diagram showing an exposed image formed on the basis of the timing chart of FIG. 17.

FIG. 18 shows exposed images of the pixels $P_1$, $P_2$ and $P_3$ corresponding to the laser emitting patterns of the pixels $P_1$, $P_2$ and $P_3$ of FIG. 17. Namely, the gradation corresponding to the pulse width and phase of the laser modulation signal of FIG. 17 can be obtained. In this example, since the comparison signal is equal in frequency to the pixel clock PCLK of 24 DPM, the space frequency of the intermediate gradation image becomes equal to 24 lpm (line/mm).

On the other hand, FIG. 19 shows an example where the selector 19 has selected the output of the voltage comparator 18B with the select signal. When the triangular wave signal of the frequency equal to a half that of the pixel clock PCLK as the comparison signal, the voltage comparator 18B outputs the laser modulation signal as shown in the figure and the pixels $P_1$, $P_2$ and $P_3$ corresponding to the image data can be formed by the laser emitting pattern depending on the laser modulation signal.

Figure 20:
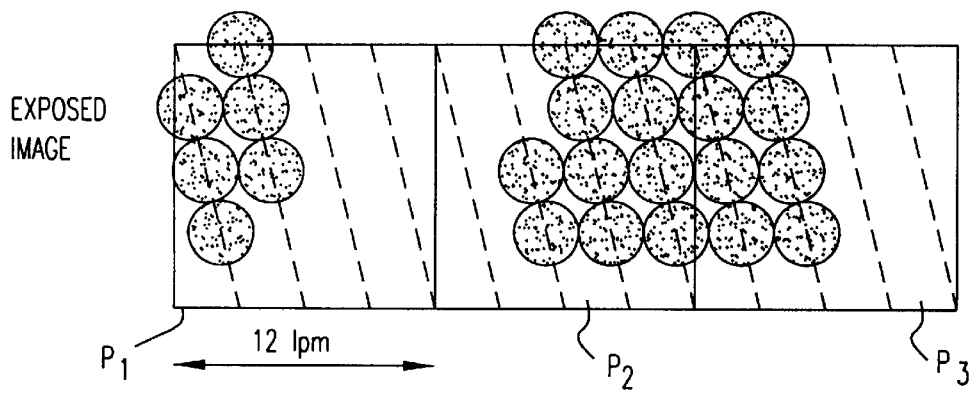
FIG. 20 is an explanatory diagram showing an exposed image formed on the basis of the timing chart of FIG. 19.

FIG. 20 shows exposed images of the pixels $P_1$, $P_2$ and $P_3$ and the space frequency of the image formed on the photosensitive drum 9 becomes equal to 12 lpm.

Figure 21:
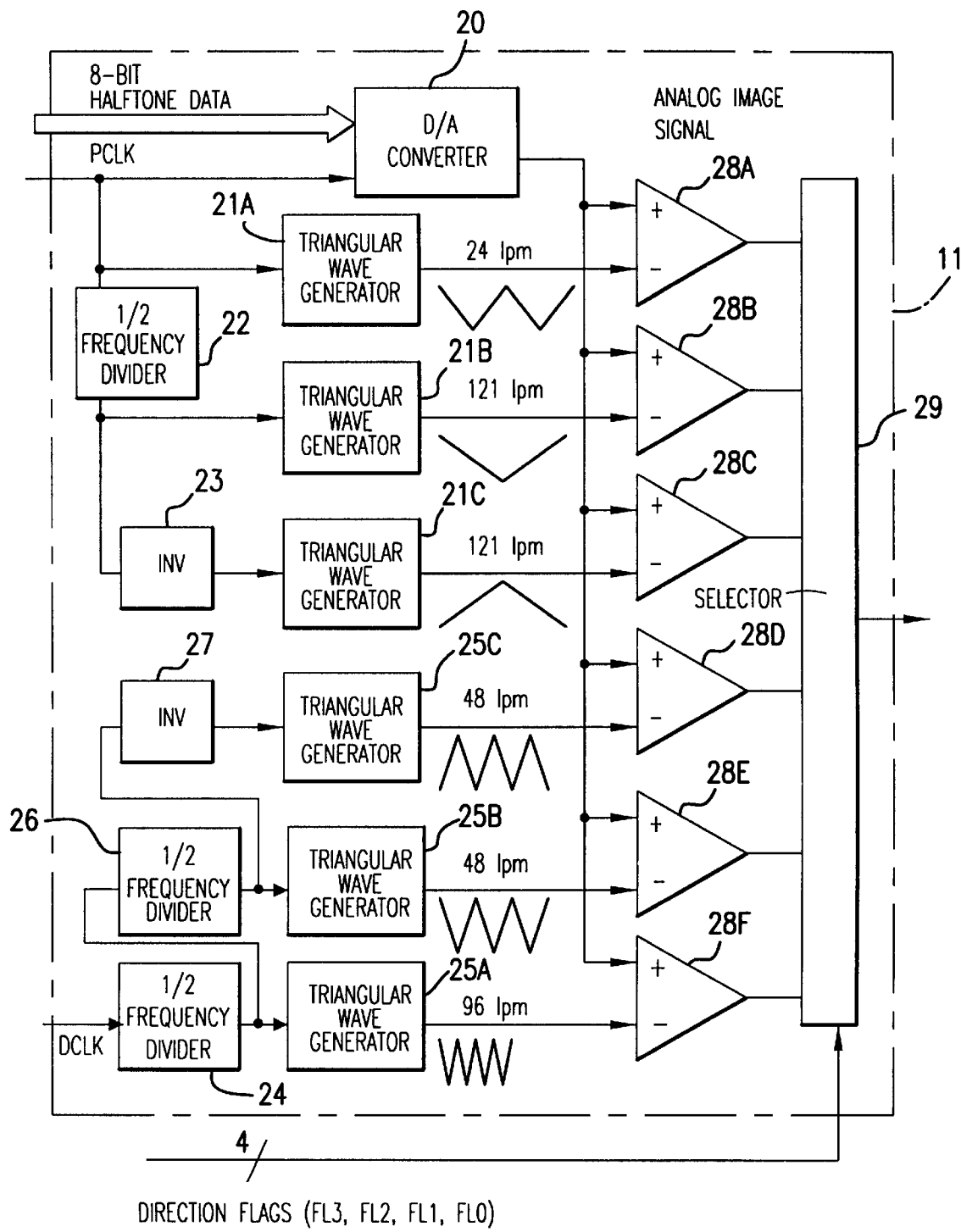
FIG. 21 is an explanatory diagram showing the structure of laser control means in relation to a fifth embodiment of the present invention.

FIG. 21 shows the structure of the laser control means 11 of an optical beam scanning apparatus and image forming apparatus as a fifth embodiment of the present invention. In this embodiment, image forming is performed with the halftone data forming one pixel with eight bits and the data having the direction flag of four bits. The halftone data of eight bits is converted to an analog signal by a D/A converter 20 for converging digital data into an analog signal and is then inputted to the positive inputs of voltage comparators 28A to 28F. Meanwhile, a triangular wave generator 21A generates a triangular wave signal of the same frequency as the pixel clock PCLK and applies this signal to the negative input of the voltage comparator 28A. A triangular wave generator 21B generates a triangular wave signal from the signal of the frequency divided to a half from the frequency of the pixel clock PCLK with a ½ frequency divider 22 and applies this signal to the voltage comparator 28B as a comparison signal. A triangular wave generator 21C generates a triangular wave signal from the signal obtained by inverting the output signal of the ½ frequency driver 22 with an inverter 23 and applies this signal to the voltage comparator 28 as a comparison signal. A triangular wave generator 25A generates a triangular wave signal from the signal of the frequency divided by a ¼ frequency divider 24 to one-fourth from the frequency of the dot clock DCLK and applies this signal to the negative input of the voltage comparator 28F as a comparison signal. A triangular wave generator 25B generates a triangular wave signal from the signal of the frequency divided further to a half by a ½ frequency divider 26 from the signal of the frequency divided to one-fourth by the ¼ frequency divider 24 from the dot clock DCLK and then applies the triangular signal to the voltage comparator 28E as a comparison signal. A triangular wave generator 25C generates a triangular wave signal from the signal obtained by inverting the output signal from the ½ frequency divider 26 with an inverter 27 and applies this signal to the voltage comparator 28D as a comparison signal. The voltage comparators 28A to 28F compare the triangular wave signals from the triangular wave generators 21A to 21C and the triangular wave generators 25A to 25C with analog image signals and output a pulse signal depending on the value of the halftone data. A selector 29 selects any one output of the voltage comparators 28A to 28F depending on direction flags (FL3 to FL0) of four bits and outputs this output to the laser drive circuit 13 as the laser modulation signal.

FIG. 22 shows the direction flags of four bits given to the image data of eight bits. Among the direction flags FL0 to FL3, the flag FL3 enables the edge processing and when FL3=0, the edge processing is not executed. In this case, the selector 29 selects the output of the voltage comparator 28B and outputs halftone of 12 lpm like the fourth embodiment. When FL3=1, the edge processing shown in the figure is executed on the basis of the direction flags FL2 to FL0.

Figure 23:
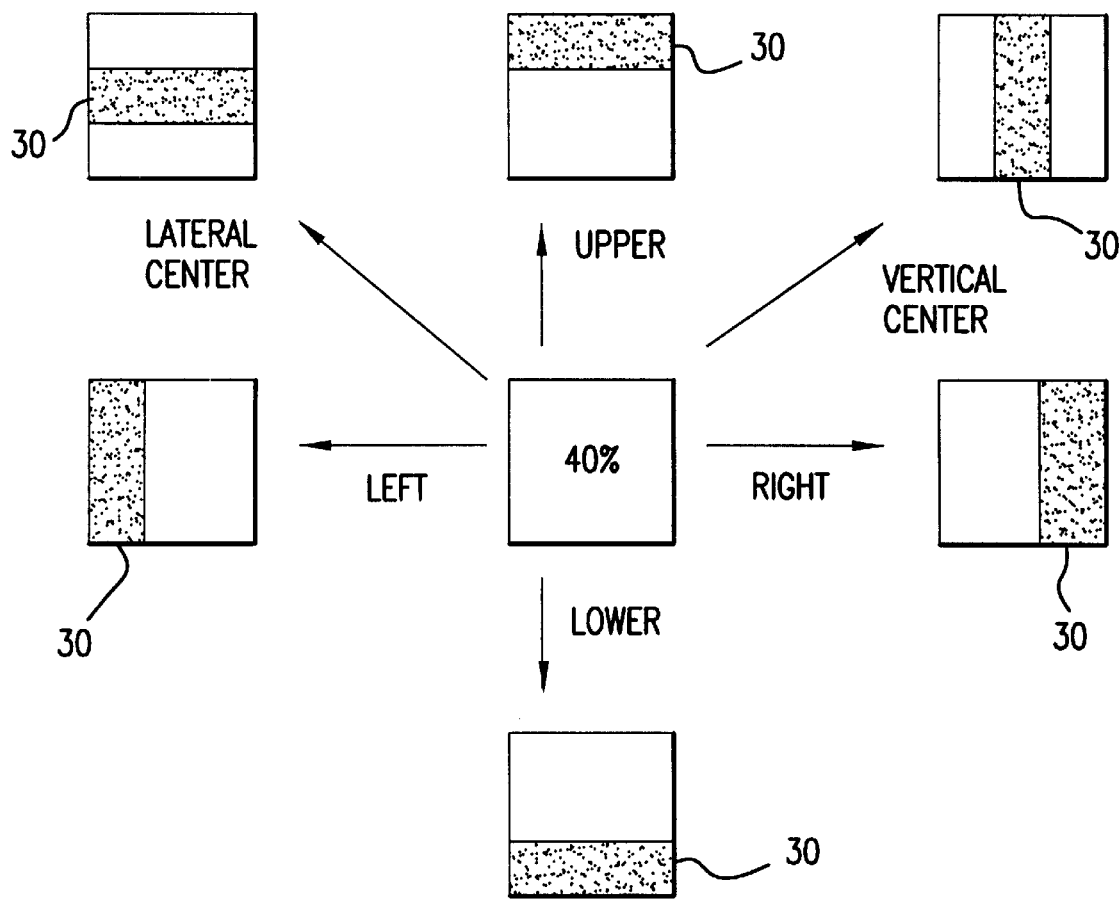
FIG. 23 is an explanatory diagram showing edge processings on the basis of the direction flags in relation to the fifth embodiment.

FIG. 23 shows an image forming region 30 in one pixel by each edge processing. A square shows one pixel and "40%" shows the value of concentration, or a gray scale of one pixel. When FL3 to FL0 are for example "1000," the 40% region in the right side of one pixel is irradiated with the laser beam.

Figure 24:
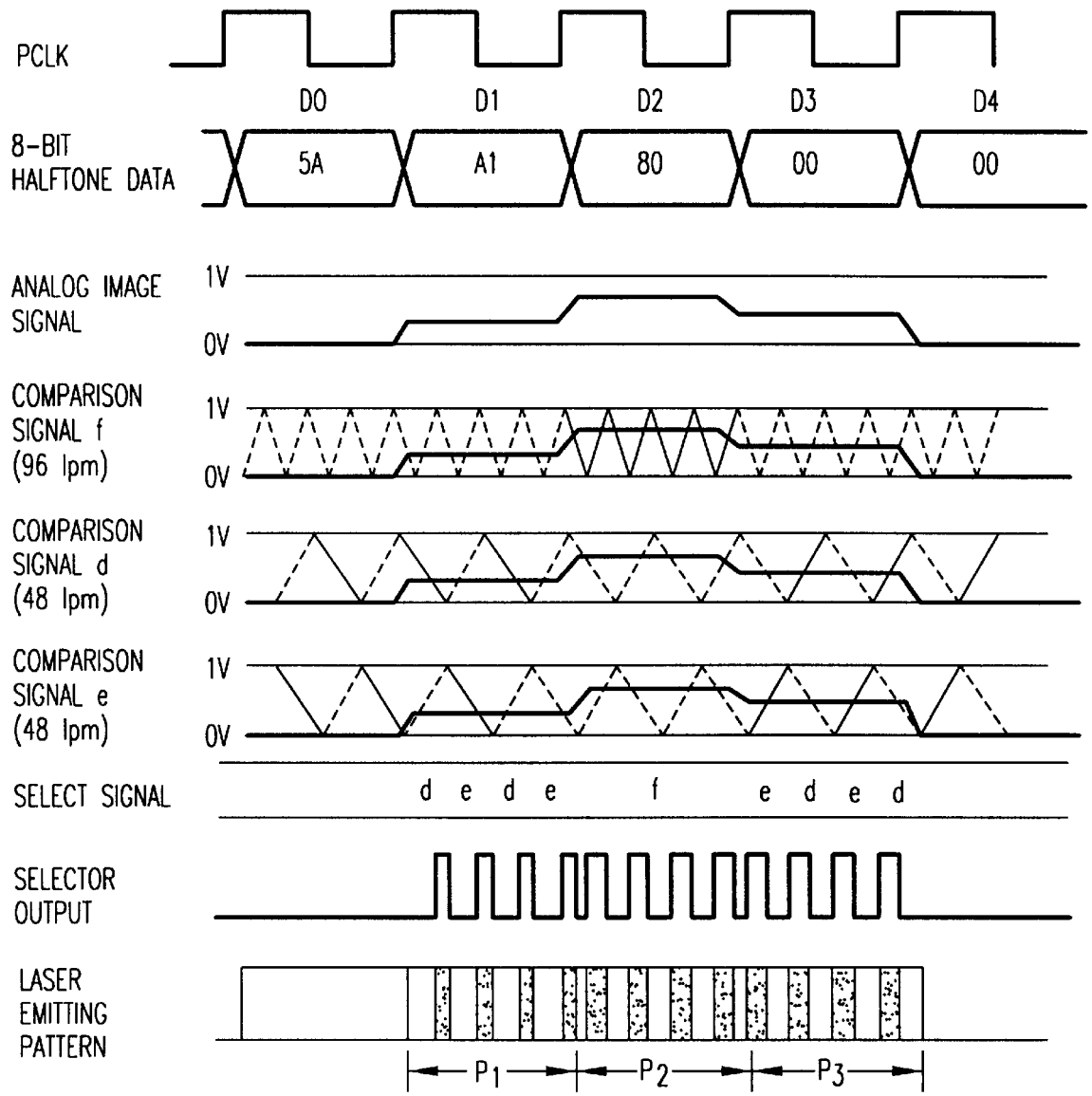
FIG. 24 is a timing chart showing the operation of the fifth embodiment.

FIG. 24 shows a fine addressing operation performed in one pixel. In this case, 2-phase, 48 lpm triangular signals d and e (outputs of the triangular wave generators 25B and 25C) generated from the pixel clock PCLK and a 96 lpm triangular signal f (output of the triangular wave generator 25A) are used. Input image data are 5A, A1 and 80 and the direction flags FL3 to FL0 corresponding to the edge processings for the lower part (1001), lateral center part (1101) and upper part (1011) are given to the respective pixels. When the direction flags FL3 to FL0 means the lower edge processing, the selector 29 alternately selects the voltage comparators 28D and 28E with the selection signal dede. When the direction flags FL3 to FL0 means the upper edge processing, the selector 29 alternately selects the voltage comparators 28D and 28E in the inverse sequence with the selection signal eded. When the direction flags FL3 to FL0 means the lateral center edge processing, the selector 29 selects the voltage comparator 28F with the selection signal f.

Figure 25:
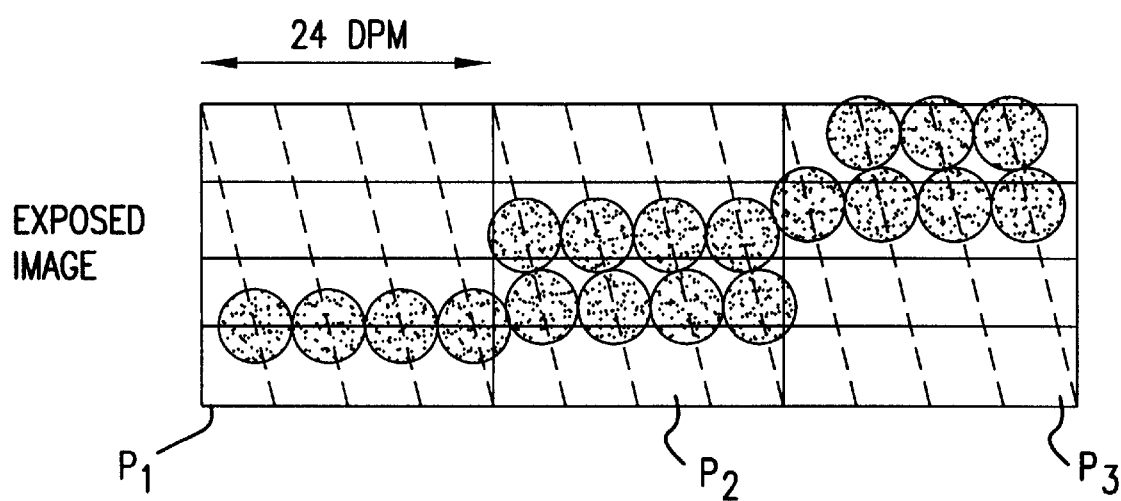
FIG. 25 is an explanatory diagram showing an exposed image formed on the basis of the timing chart of FIG. 24.
Figure 26:
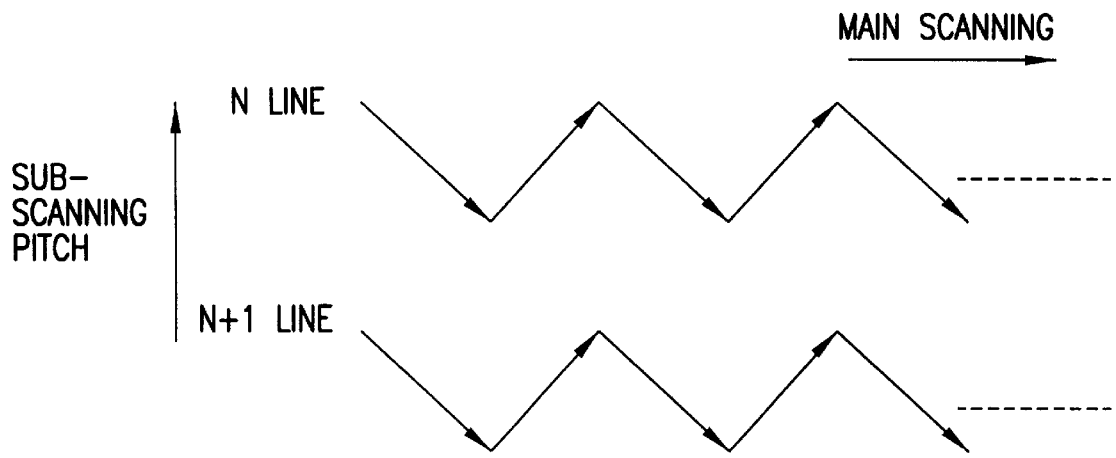
FIG. 26 is an explanatory diagram showing an optical beam scanning system of the related art.
Figure 27:
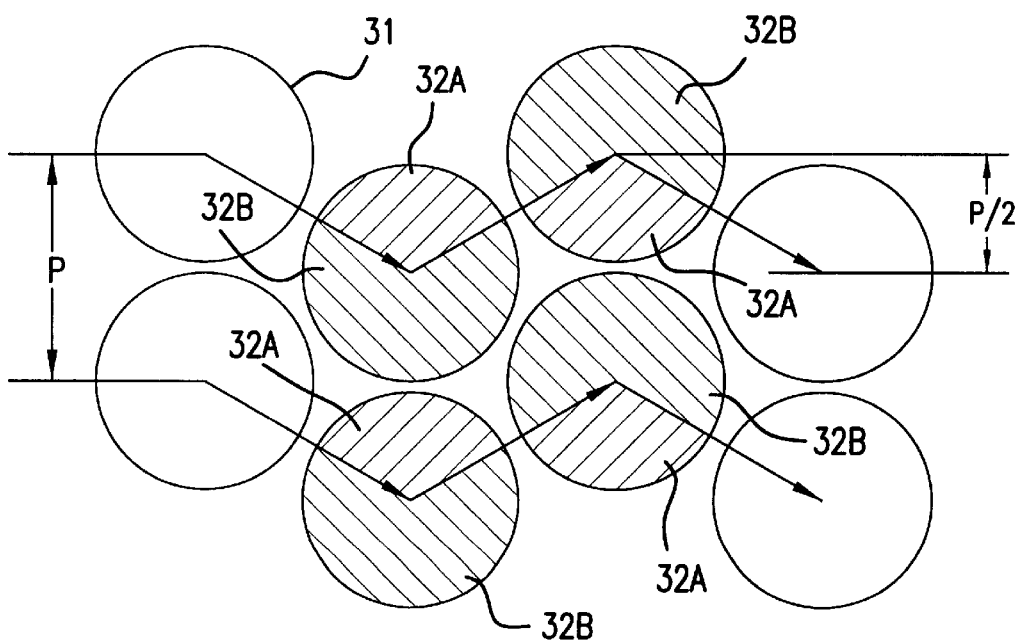
FIG. 27 is an explanatory diagram showing an exposed image formed on the basis of the optical beam scanning system of the related art.

FIG. 25 shows the pixels $P_1$ to $P_3$ formed by the processings as explained above. Namely, an exposed image where the line position transits from the lower line to the upper line in the pixel density of 24 DPM.

In the above embodiments, one optical beam is sequentially emitted from the light source to a plurality of radiation spots forming one pixel of image information, but it is also possible to emit a plurality of optical beams simultaneously from a plurality of emitting sections by utilizing a multi-beam type light source. In this case, one optical beam is scanned in zigzag on a plurality of main scanning lines, while the other optical beam may be scanned on one main scanning line.

As explained above, the optical beam scanning method and apparatus of the present invention realizes the scanning with higher resolution in the sub-scanning direction because the optical beam is scanned to sequentially follow linear scanning lines with a predetermined angle for the main scanning line on the scanning surface.

Moreover, the image forming method and apparatus of the present invention forms an exposed image by scanning the optical beam to sequentially follow linear scanning lines with a predetermined angle for the main scanning direction on a photosensitive drum to enhance resolution in the sub-scanning direction without generation of ununiform distribution of exposure and thereby to realize formation of a high precision and high quality image.

Although the preferred embodiments of the present invention have been described and illustrated, it will be apparent to those skilled in the art that various modifications may be made without departing from the principles of the invention.

What is claimed is:

1. An optical beam scanning apparatus, comprising:

a light source for emitting an optical beam modulated depending on image information;

scanning means for scanning a scanning surface along a plurality of main scanning lines with said optical beam in a main scanning direction;

deflecting means for deflecting said optical beam in a sub-scanning direction; and control means for scanning, by controlling said light source, scanning means and deflecting means, the scanning surface with said optical beam along a main scanning line of the plurality of main scanning lines in said main scanning direction by scanning said scanning surface with said optical beam along a plurality of parallel scanning lines inclined by a predetermined angle away from the main scanning direction;

wherein, said plurality of parallel scanning lines align with a plurality of parallel scanning lines in other main scanning lines of the plurality of main scanning lines so that the plurality of parallel scanning lines appear continuous in the plurality of main scanning lines on said scanning surface.

2. An optical beam scanning apparatus recited in claim 1, wherein said control means causes said scanning means to scan with said optical beam in said main scanning direction and said control means causes said deflecting means to deflect said optical beam in said sub-scanning direction so that the scanning locus of said optical beam becomes a sawtooth shape within each main scanning line.

3. An optical beam scanning apparatus recited in claim 1, wherein said control means causes said scanning means to scan with said optical beam in said main scanning direction, said control means causes said deflecting means to deflect said optical beam in said sub-scanning direction so that the scanning locus of said optical beam becomes a triangular shape within each main scanning line and said control means also causes said light source to emit said optical beam only during a half period of a deflecting period of said defecting means.

* * * * *